US012242985B2

(12) United States Patent
de Kadt et al.

(10) Patent No.: US 12,242,985 B2
(45) Date of Patent: *Mar. 4, 2025

(54) PORTABLE NETWORK INTERFACES FOR AUTHENTICATION AND LICENSE ENFORCEMENT

(71) Applicant: Amazon Technologies, Inc., Seattle, WA (US)

(72) Inventors: Christopher Richard Jacques de Kadt, Cape Town (ZA); James Alfred Gordon Greenfield, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,790

(22) Filed: Apr. 1, 2022

(65) Prior Publication Data
US 2022/0222593 A1    Jul. 14, 2022

Related U.S. Application Data

(63) Continuation of application No. 15/917,085, filed on Mar. 9, 2018, now Pat. No. 11,295,246, which is a (Continued)

(51) Int. Cl.
*G06Q 10/06* (2023.01)
*G06Q 10/00* (2023.01)
(Continued)

(52) U.S. Cl.
CPC ............ *G06Q 10/06* (2013.01); *G06Q 10/00* (2013.01); *G06Q 10/0631* (2013.01); *H04L 63/10* (2013.01); *G06Q 2220/00* (2013.01)

(58) Field of Classification Search
CPC ........ H04L 63/10; G06Q 10/06; G06Q 10/00; G06Q 10/0631; G06Q 2220/00
(Continued)

(56) References Cited

U.S. PATENT DOCUMENTS 7,089,594 B2 * 8/2006 Lal ...................... G06Q 20/123
726/30
7,174,455 B1    2/2007 Arnold et al.
(Continued)

FOREIGN PATENT DOCUMENTS

JP    2002368763    12/2002
JP    2004264911    9/2004

OTHER PUBLICATIONS

Hideharumatsubara, "Introduction to Programming for Practical Use of the Cloud, from the Basics of Amazon EC2/S3 to Intracompany Cloud Operation Design", Software Design, vol. 240, Japan, Gijutsu-Hyohron Co., LTD., 2011, pp. 34-39, (Japanese Version Only).
(Continued)

Primary Examiner — Luna Champagne
(74) Attorney, Agent, or Firm — Robert C. Kowert; Kowert, Hood, Munyon, Rankin & Goetzel, P.C.

(57) ABSTRACT

Methods and apparatus for portable network interfaces to manage authentication and license enforcement. A system may include a plurality of resource instances including a producer instance configured to implement a network-accessible service, and an authentication coordinator. The coordinator may assign an interface record to the service, wherein the interface record comprises an IP address and a set of security properties. The coordinator may configure the security properties to allow a client to request an attachment of the interface record to a selected resource instance, such that the selected resource instance is enabled to transmit network messages from the IP address using one or more physical network interfaces of the selected resource instance. The producer resource instance initiates authentication operations for the service, including at least one authentication operation based on the IP address of the interface record.

20 Claims, 12 Drawing Sheets

Related U.S. Application Data continuation of application No. 13/408,902, filed on Feb. 29, 2012, now Pat. No. 9,916,545.

(51) Int. Cl.
*G06Q 10/0631* (2023.01)
*H04L 9/40* (2022.01)

(58) Field of Classification Search
USPC ........................................................ 715/736
See application file for complete search history.

(56) References Cited

U.S. PATENT DOCUMENTS

| | | | |
|---|---|---|---|
| 7,210,147 B1 | 4/2007 | Hipp et al. | |
| 7,383,433 B2 | 6/2008 | Yeager et al. | |
| 7,555,769 B1 | 6/2009 | Shapiro et al. | |
| 7,703,102 B1* | 4/2010 | Eppstein | H04L 67/1023 |
| | | | 718/100 |
| 7,962,950 B2 | 6/2011 | Choo et al. | |
| 7,984,066 B1 | 7/2011 | Kilday et al. | |
| 8,244,778 B1 | 8/2012 | Wei et al. | |
| 8,484,089 B1 | 7/2013 | Lin et al. | |
| 8,813,225 B1 | 8/2014 | Fuller et al. | |
| 8,868,710 B2 | 10/2014 | Schultze et al. | |
| 8,924,543 B2 | 12/2014 | Raleigh et al. | |
| 9,166,947 B1 | 10/2015 | Tian et al. | |
| 9,916,545 B1 | 3/2018 | de Kadt et al. | |
| 11,295,246 B2 | 4/2022 | de Kadt et al. | |
| 2002/0106985 A1 | 8/2002 | Salo et al. | |
| 2003/0053441 A1 | 3/2003 | Banerjee | |
| 2004/0078371 A1 | 4/2004 | Worrall et al. | |
| 2005/0060568 A1 | 3/2005 | Beresnevichiene et al. | |
| 2005/0198384 A1 | 9/2005 | Ansari et al. | |
| 2006/0262736 A1 | 11/2006 | Dong et al. | |
| 2007/0079307 A1 | 4/2007 | Dhawan et al. | |
| 2007/0214506 A1* | 9/2007 | Rao | H04L 51/212 |
| | | | 726/25 |
| 2008/0104393 A1 | 5/2008 | Glasser et al. | |
| 2008/0127354 A1 | 5/2008 | Carpenter et al. | |
| 2008/0177845 A1 | 7/2008 | Bracewell et al. | |
| 2008/0178264 A1* | 7/2008 | Keohane | H04L 9/3226 |
| | | | 726/3 |
| 2008/0267087 A1 | 10/2008 | Beck et al. | |
| 2009/0205018 A1 | 8/2009 | Ferraiolo et al. | |
| 2009/0228967 A1 | 9/2009 | Gbadegesin et al. | |
| 2009/0276774 A1 | 11/2009 | Kinoshita | |
| 2009/0288084 A1 | 11/2009 | Astete et al. | |
| 2009/0296566 A1* | 12/2009 | Yasrebl | H04L 41/5087 |
| | | | 370/221 |
| 2009/0300706 A1 | 12/2009 | Ray et al. | |
| 2010/0049637 A1 | 2/2010 | Lavenlman et al. | |
| 2010/0131649 A1 | 5/2010 | Ferris | |
| 2010/0131949 A1 | 5/2010 | Ferris | |
| 2010/0132012 A1 | 5/2010 | van Riel et al. | |
| 2010/0287548 A1 | 11/2010 | Zhou et al. | |
| 2011/0022694 A1 | 1/2011 | Dalal et al. | |
| 2011/0040824 A1 | 2/2011 | Harm | |
| 2011/0041141 A1 | 2/2011 | Harm et al. | |
| 2011/0072486 A1 | 3/2011 | Hadar et al. | |
| 2011/0072487 A1 | 3/2011 | Hadar et al. | |
| 2011/0137947 A1 | 6/2011 | Dawson et al. | |
| 2011/0142053 A1 | 6/2011 | Van Der Merwe et al. | |
| 2012/0131469 A1* | 5/2012 | Yamuna | G06F 9/54 |
| | | | 715/736 |
| 2012/0240135 A1 | 9/2012 | Risbood et al. | |
| 2013/0125112 A1 | 5/2013 | Mittal et al. | |
| 2013/0132545 A1* | 5/2013 | Schultze | H04L 41/5051 |
| | | | 709/223 |
| 2013/0290960 A1 | 10/2013 | Astete et al. | |

OTHER PUBLICATIONS

Ken Tamagawa, "Amazon Web Services Enterprise Support that has finally begun", G-Cloud Magazine 2011 Autumn, Japan, Gijutsu-Hyohron Co. LTD., 2011, pp. 34-39, (Japanese Version Only).

Gonzales, Dan, et al., "Cloud-trust-A security assessment model for infrastructure as a service (IaaS) clouds", IEEE, Transactions on Cloud Computing 5.3 (2015), pp. 523-536, (Year 2015).

Popovic, K, et al., "Cloud computing security issues and challenges", the 33rd International Convention Mipro, IEEE, 2010, pp. 1-6.

* cited by examiner

PORTABLE NETWORK INTERFACES FOR AUTHENTICATION AND LICENSE ENFORCEMENT

This application is a continuation of U.S. patent application Ser. No. 15/917,085, filed Mar. 9, 2018, which is a continuation of U.S. patent application Ser. No. 13/408,902, filed Feb. 29, 2012, now U.S. Pat. No. 9,916,545, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other functionality allow customers to build add-on services on top of the provided infrastructure, and expose those services to other customers of the provider networks. For, example, one class of clients, which may be referred to as "producer" clients, may implement a database or a content management system using virtualized resources provided by the provider network, and may allow another class of clients, which may be referred to as "consumer" clients, to access the database or content management system from their own resources within the provider network. In some cases both roles may even be shared by a single client—i.e., a consumer client of one service may be a producer client of another service. As the sophistication of the services provided within the provider networks increases, and as the autonomy and control granted to clients to manage networking characteristics such as the Internet Protocol (IP) addresses of provider network resources expands, the complexity of managing license management for, and authenticating access to, the services provided by producer clients also grows.

Figure 1:
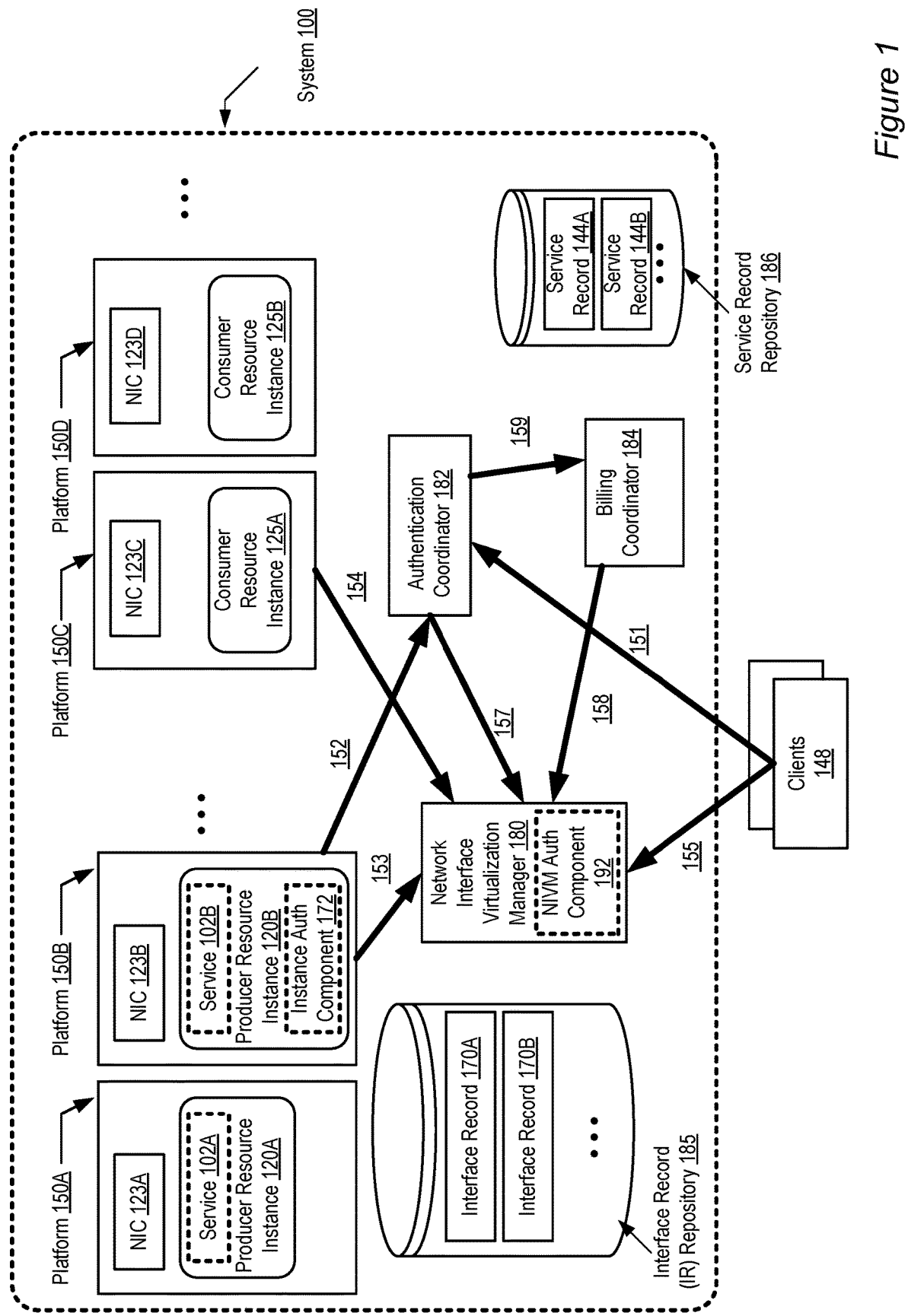
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for authentication and license management using portable network interfaces are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider.

Operators of such provider networks may in some instances allow clients to build their own services, applications or functions on top of the core infrastructure functionality provided by the provider network itself, and expose this enhanced functionality to other users of the provider network (and/or to users that are allowed to access the provider network from external networks). The first class of clients, which provide the enhanced functionality or services using the resources made available by the provider network, will be referred to herein as "producer" clients, and the resource instances used to implement the enhanced functionality within the provider network may be referred to herein as "producer" resource instances. Users of the enhanced functionality, who need to access the provider resource instances to make use of the enhanced functionality or service, often but not always from other resources of the provider resource, will be referred to as "consumer" clients herein. The resource instances of the consumer clients may be referred to herein as consumer resource instances. For example, a producer client may implement server instances of a sophisticated computer-aided design (CAD) program using compute and/or storage resource instances of the provider network, and wish to allow licensed users of the CAD software to access the CAD servers from other compute resources of the provider network. Similarly, a company that implements biomedical informatics applications, such as genome analysis programs, may take advantage of the flexible compute capabilities of a provider network to set up their applications, and expose the applications to their own licensed clients that may also be users of the provider networks. A resource instance (either a consumer resource instance or a producer resource instance) may in some embodiments comprise a virtual entity or entities (e.g., a virtual server, device, and/or associated software), a non-virtualized physical server, or a combination of virtual and physical entities.

Over time, provider network operators have provided more and more sophisticated and flexible configuration choices for the resource instances their clients wish to use. For example, in some environments a set of resources such as virtualized compute servers and/or storage servers, together with associated networking equipment, may be allocated to a client as a logically-isolated network, which may for example be termed a "virtual private cloud (VPC)" or a "logical partition". Such a logically-isolated network may have an associated Internet Protocol (IP) address range, expressible for example using a Classless Internet Domain Routing (CIDR) prefix, comprising a requested number of IP addresses to be used within the network for the resource instances of the network. To provide the desired level of administrative control to the client for whom the logically-isolated network was set up (which may be termed the "owner" client of the logically-isolated network), the owner client may be allowed to assign and reassign IP addresses of the associated network address range as needed to the various resource instances of the logically-isolated network. From a given resource instance within such a logically-isolated network, other instances within the network may be reachable in a manner very similar to the way devices connected to a single physical network in a client data center are reachable to each other. However, network access across logical network boundaries (i.e., traffic between one resource instance R1 in a logically-isolated network N1 and a resource instance R2 in another logically-isolated network N2) may typically require additional networking configuration, such as the establishment of a gateway or proxy between the two participating logically-isolated networks and/or other networking configuration operations such as network route advertisements.

To further enhance the flexibility with which different sets of resources may be accessed without having to resort to cumbersome security setting modifications, reconfiguring and/or physically moving network interface cards, in some embodiments an operator of a provider network may set up a set of virtualization services for network interfaces. Such services may be enabled by a network interface virtualization manager (which may be referred to using the abbreviation "NIVM" in this document) responsible for maintaining, and implementing various operations on, a set of persistent, transferable interface records (IRs) to manage networking operations required to access various resources of the provider network. An NIVM may, for example, allow clients to "attach" resource instances to IRs and "detach" IRs from instances. By attaching an IR to a resource instance, network traffic flow to/from an IP address (or addresses) that are associated with the IR may be enabled for the resource instance, in accordance with security properties set up for the IR. By detaching an IR from a resource instance, network traffic flow to/from an IP address associated with the IR may be disabled for the resource instance. A set of properties associated with an IR may specify which specific entities (e.g., one or more producer clients or consumer clients) are allowed to attach the IR to a resource instance. The IRs themselves may be implemented as software entities stored within a persistent store in some embodiments, so that the various IR properties (IP addresses, security settings etc.) remain independent of hardware networking equipment such as (network interface cards) NICs that may be utilized to transmit the network packets of the instance traffic. So, for example, a client may first attach an IR "A" with IP address "Addr1" to a resource instance "R1", allowing R1 to transmit network traffic with Addr1 as the source address using a NIC that may be available on the hardware platform where R1 happens to be running. Then, the client may detach "A" from R1 (thus disallowing traffic with source IP address Addr1 from R1) and then attach "A" to another resource instance R2, thus enabling R2 to transmit traffic with the same source address Addr1, and in accordance with the same set of security properties that were previously being enforced for R1. Additional details of IR properties and how IRs may be used for various purposes are provided below.

In some embodiments, in addition to the basic connectivity functionality described briefly above, IRs may also be employed for authentication purposes, e.g., to ensure that only those clients or users that have valid licenses or the right permissions are allowed to access a service provided at a producer resource instance. IRs may also be used ensure that a given service is provided only from those producer resource instances that are permitted to do so. Authentication-related IR functionality may be incorporated in some embodiments by an authentication coordinator comprising any combination of a number of different software and/or hardware components. In one embodiment, for example, an authentication component within an NIVM may implement many of the IR authentication-related functions, either independently or in cooperation with instance authentication components within various resource instances. In other embodiments, an authentication coordinator may comprise a standalone component or entity as well as, or instead of, NIVM authentication components or instance authentication components. In some embodiments, different parts of the functionality of the authentication coordinator and/or the NIVM itself may be incorporated within several different co-operating software components and/or devices, such as modules of hypervisor or operating system software running on various hardware platforms of the provider network, router software on edge devices, and the like.

In one embodiment the authentication coordinator may be operable to assign or link an IR to a given service or a portion of a given service that may be provided from a producer resource instance. For example, such an assignment may be performed in response to a request from a producer client that is interested in using IRs for service authentication. In addition, the authentication coordinator may be operable to configure one or more security properties of the IR, allowing a specified client to request the attachment of the IR to a resource instance (which may be selected by the client from among resource instances allocated to the client). Such an attachment may enable network packets or messages from that selected resource instance to indicate an IP address of the attached IR as the source IP address. The producer resource instance may then be able to use the properties of the IR to initiate or perform one or more authentication operations associated with the service it provides. For example, based on one service authentication mode that may be employed in some embodiments, the source IP address of one or more service requests received at the provider resource instance may be checked to ensure that the source IP address is among the IP addresses of a set of IRs assigned to the service. In some implementations, for example, service requests may be authenticated in this manner once during a user session; in other implementations, each request may be checked, or requests may be checked periodically, depending on the nature of the service being provided and the type of service agreements in place. In one environment, consumer clients may also be granted permission to transfer the IR to a different instance. That is, in such an environment a consumer client may request a detachment of the IR from one consumer resource instance, thus disabling access to the service from that instance, and then request an attachment of the IR to another consumer resource instance, thereby enabling access to the service from the other instance.

In several embodiments, the producer resource instance may be in a different logically-isolated network (or virtual private cloud) than the consumer resource instance. Within their respective logically-isolated networks, the resource instances may already be using interface records for inter-instance connectivity. So, for, example, the provider resource instance may already be attached to an IR "IR-P1", and the consumer resource instance may already be attached to an IR "IR-C1". The IP address of the IR to be used for authenticating the consumer's requests (which may be termed the "IR-Auth" interface record) may lie within the range of IP addresses of the producer's logically-isolated network. As a result of attaching the consumer resource instance to IR-Auth, therefore, traffic flow may be enabled between the consumer's logically-isolated network and the consumer's logically-isolated network in such embodiments, and service requests from the consumer may pass authentication checks at the producer resource instance.

In certain embodiments, a license agreement may be associated with an IR; for example, the IR may contain a pointer to, or an actual copy of, a license previously agreed to between a consumer client and the producer client. Before performing a requested operation from a consumer instance to which the IR is attached, the validity of the license may be verified in such embodiments. The duration for which a resource instance remains attached to an IR may be usable in some embodiments to make billing decisions for the service. For example, in one such embodiment, a service agreement for a particular service may specify that a consumer client is to be charged a billing amount based on how many hours a resource instance of the client was attached to an IR assigned to the service. In some embodiments, depending for example on the nature of the service, instances may become billable as soon as they are attached to an assigned IR and remain billable for the service even if they are detached. A billing amount may be determined based on when the instance was first attached to the IR in such cases, even if the IR were subsequently detached from that instance (and potentially attached to some other consumer instance). An IR may also comprise indications of, or pointers to, product codes, metering codes, and other properties of the assigned service that may be useful for a variety of administrative functions such billing, analytics, usage analysis, forecasting, and the like in various embodiments.

The service request checking functionality described above, in which requests sent from consumer instances may be checked to ensure that they originated from a source with the appropriate access rights, may be referred to as an example of an implementation of a "Check Request" authentication mode herein. Other authentication modes may also be implemented using IRs. For example, in some embodiments, an authentication mode termed "Call Home" may be implemented, in which a provider resource instance providing part or all of a service may be attached to an IR assigned to the service, and periodic "service continuation requests" may be used to determine whether provision of the service is to continue from that resource instance. In the "Call Home" authentication mode, the goal is to ensure that the service is being provided from an approved resource instance. Such an authentication mode may be appropriate, for example, in environments where a given provider service instance may have a very large number of consumer instances, as a result of which checking IP addresses of requests may be impractical. Such modes may also be used if the overhead of checking client requests may be undesirable for other reasons, or if the nature of the service is such that it is preferable to authenticate on the provider side rather than the consumer side. In one embodiment where "Call Home" authentication is employed, a producer resource instance may periodically (e.g., once every five minutes, once every hour, or once every day) transmit a service continuation request to a designated entity such as an authentication coordinator. The designated entity may perform an authentication check, e.g., by determining whether the service continuation request was sent from an IP address of an IR assigned to the service being provided by the producer resource instance, by validating a license pointed to from the IR, or the like. If the authentication check succeeds, the designated entity may send a response indicating that provision of the service is to continue from the producer resource instance. If the authentication check fails, further provision of the service, at least from the resource instance that sent the service continuation, may be disabled in some implementations. Both "Check Request" and "Call Home" authentication modes may be supported in some embodiments, while in other embodiments only one of these two modes may be implemented. Other authentication modes may be supported in some embodiments.

In one environment, a single IR may be assignable to multiple services. For example, a producer client may implement portions of both a content management service and a customer relationship management service using a single large producer resource instance, and there may be separate service and/or billing agreements or product codes associated with the different services. Pointers to details of both services may be included within a single IR in such embodiments, and authentication checks for both services may rely on the properties of the same IR. Multiple IRs may be used for access to the same service (or same producer instance) in some embodiments. For example, in one embodiment, a large producer compute instance may be set up for service provision to numerous different consumer client organizations around the world, and different IRs may be assigned for different subsets of the consumer instances. In some implementations, IRs may be requested, reserved, and/or allocated prior to deciding exactly which resource instance will be deployed to provide the service, or which instances will consume the service.

When a service, or a portion of a service, is to be disabled or discontinued, e.g., as a result of license expiration or a termination of a service agreement, any combination of a number of different actions may be taken in various embodiments. For example, an IR being used for authentication may be detached from the consumer resource instance or producer resource instance to which it is currently attached. Permissions to attach/detach the IR to the resource instance to which it is currently attached, or to any resource instance at all, may be revoked. The IR may be disassociated from the service to which it was previously assigned. In some embodiments the IR may be deleted, e.g., it may be removed from the persistent repository used to store IRs.

As described above, IRs may be usable for at least two types of functions in some provider network environments: to support connectivity (e.g., by enabling network traffic to flow between resource instances), and to support service authentication. Within a given provider network in one embodiment, not all the IRs may be used for authentication; i.e., some may be used for connectivity management alone.

The functionality utilizing interface records described above may provide an elegant and secure solution to service authentication within many provider network environments. While producer and consumer clients may request IR operations such as attach and detach, the ability to actually perform the operations on interface records (e.g., their creation, storage, assignment to services, the implementation of attachment and detachment operations, and the enforcement of their security properties, etc.) may be restricted to entities such as NIVMs and authentication coordinator components that lie within a "control plane" of the provider network, which cannot be manipulated by clients. By utilizing control plane IR functionality for authentication, the likelihood of malicious or unintentional misuse of licenses and/or unauthenticated use of services, may be dramatically reduced without sacrificing efficiency or cost, even in provider network environments where clients may assign or reassign public and/or private IP addresses to their allocated resource instances.

Example System Environment

FIG. 1 illustrates an example system environment, according to at least some embodiments. The system 100 may include a plurality of resource instances of a provider network, including producer resource instances 120A and 120B and consumer resource instances 125A and 125B. Resource instances may in general be allocated by clients 148 to utilize various infrastructure facilities enabled in the provider network, such as cloud computing services or cloud storage services. Whether a particular resource instance assumes a role of a producer resource instance, a consumer resource instance, both a producer and a consumer, or neither a producer nor a consumer at any given point in time may be dependent on the current needs of the client 148 to whom it is allocated. Producer clients 148 may implement a variety of add-on network-accessible services and/or enhanced functionality at their resource instances, such as service 102A or service 102B, and expose these services to their customers. Examples of such services may include, for example, a content management service, a database service, a simulation application, an operating system allowing users to log in and run their own applications, and the like. A service 102 may in general comprise any network-accessible functionality. In some implementations portions of a given service may each ne implemented on a different resource instance, and a consumer of the service may need to communicate with multiple producer resource instances to complete a given unit of work. In other implementations the same service may be available from multiple producer resource instances (e.g., multiple instances of the services may be set up, any of which may be accessed for a service request). The resource instances where the service is provided, such as instances 120A and 120B, may be termed producer resource instances for the respective provided services 102A and 102B. Other clients 148 ("consumer" clients), may have resource instances such as 125A and 125B allocated to them, and may wish to access the services 102A and 102B from their instances 125A and 125B. Instances such as 125A and 125B that access services 102A and 102B may be termed consumer resource instances for those services.

The core functionality of the provider network (e.g., access to virtual compute servers or virtual storage servers), as well as the enhanced services implemented by producer instances 120, may be implemented using a plurality of physical platforms such as platforms 150A, 150B, 150C and 150D of FIG. 1. A platform 150 for a producer resource instance 120 or a consumer resource instance 125 that provides a virtual computing system as part of the core functionality may, for example, include a hardware server with one or more CPUs (as well as associated memory, storage and networking hardware) and the software (such as a hypervisor and/or elements of an operating system) that implements the virtualization of the computing system. Similarly, a platform 150 that provides a virtual storage system may for example comprise portions or all of one or more hardware storage devices (such as disk arrays or storage appliances) and the associated processing elements and software. A given resource instance may in some embodiments be both a producer of a service and a consumer of another service, or even a producer and a consumer of the same service 102. A resource instance may be repurposed during its lifetime, and may change roles from producer to consumer and vice versa; instances may also be moved or migrated from one platform 150 to another. Furthermore, multiple resource instances may be resident on one platform 150 in some implementations, and in other implementations one resource instance may span multiple platforms 150. In one embodiment, a resource instance 120 or 125 may comprise a non-virtualized server, i.e., a resource instance may be implemented using a conventional operating system running on a bare hardware platform 150 instead of using hypervisor software.

The network traffic to and from a given resource instance 120 or 125 at a given point in time may flow over a physical NIC associated with the platform on which the instance happens to be resident at the time—e.g., NIC 123A on platform 150A for producer instance 120A, NIC 123B on platform 150B for producer instance 120B, NIC 123C on platform 150C for consumer instance 125A, and NIC 123D on platform 150D for consumer instance 125B. The IP address or addresses associated with the instance may be governed by the interface records 170 (e.g., interface records 170A and 170B in FIG. 1) that are currently attached to the instance, and may not be dependent on which NIC is being used. System 100 may include a network interface virtualization manager (NIVM) 180 operable to provide a set of virtualization services for network interfaces in the illustrated embodiment, including the ability to attach and detach interface records (termed "IRs" herein) to resource instances to enable or disable network connectivity to the instances via IP addresses associated with the interface records, as described below in further detail.

In the embodiment illustrated in FIG. 1, an authentication coordinator 182 may be configured to support authentication of services such as services 102A and 102B using interface records 170, in accordance with authentication policies specified by the producer clients 148 that expose the services 102 from their producer resource instances 120. Portions or all of the functionality of the authentication coordinator 182 may in some implementations be incorporated within the NIVM 180 (e.g., in the NIVM authentication component 192 shown in FIG. 1). In some embodiments a subset of the authentication functionality may also or instead be implemented within producer resource instances 120, e.g., within an instance authentication component 172 shown at producer resource instance 120B in FIG. 1. The authentication coordinator 182 may participate in extending the core IR connectivity functionality supported by NIVM 180 to provide various authentication features in the embodiment shown in FIG. 1.

Authentication coordinator 182, NIVM 180, clients 148, producer resource instances 120, and consumer resource instances 125 may interact with each other to request and/or implement authentication operations, as shown by the arrows labeled 151, 152, 153, 154, 155 and 157 in FIG. 1. Details of each of these types of interactions are provided below in the descriptions of FIG. 2 onwards. In addition, as shown by the arrow labeled 159 in the illustrated embodiment, the authentication coordinator 182 may provide billing-related notifications to a billing coordinator 184, e.g., to identify which instance records 170 should be used when computing billing amounts for a given service based on interface record attachment times. The billing coordinator 184 may interact with the NIVM 180 directly in some embodiments to perform billing-related operations in some embodiments, as illustrated by the arrow labeled 158. Interface records may be stored within a persistent interface repository 185 in the illustrated embodiment. In some implementations service-related records such as service record 144A and 144B, which may for example comprise service properties such as the authentication mode to use for a service, mappings between services 102 and producer resource instances 120, license artifacts, and the like, may also be stored in a persistent repository such as service record repository 186. Persistent repositories 185 and 186 may be accessible only by control plane entities of the provider network, such as NIVM 180 and authentication coordinator 182, and may not be visible to or accessible by clients 148 in the depicted embodiment.

The core IR functionality supported by the NIVM 180 may include, for example, the ability to create, attach, detach, modify, query, and delete interface records in response to requests from authentication coordinator 182 and/or clients 148. For example, a producer client 148 may send a request 151 to authentication coordinator 182, requesting support for authentication of a service 102. The authentication coordinator 182 may respond by sending a request 157 to NIVM 180 to create a new interface record 170. The NIVM 180 may, in response to the request 157, generate an interface record such as 170A that contains a set of networking-related and service-related properties that can be associated and disassociated on demand with various resource instances 120 or 125. The interface records 170 may initially be generated in a set of in-memory data structures, and may (as noted above) be stored in repository 185, such as a database on persistent storage, in some implementations. An interface record 170 for a network that used the TCP/IP protocols may include, for example, one or more IP addresses, one or more subnet identifiers of the subnets that contain the IP address or addresses, information about services that may be assigned to the interface, and a set of security properties, as described in conjunction with the description of FIG. 2 below. In some implementations the interface record 170 may also include one or more other fields such as various status fields, source and destination address check settings, billing-related information, an identification of a currently associated resource instance 120 or 125, the Media Access Control (MAC) address of a physical NIC 123 currently associated with the interface record, and the like. Interface records for networks employing network protocols other than TCP/IP may include network address-related information appropriate for the protocol used. At the time an interface record is created, many of its fields or properties may be blank or stubbed out, awaiting further configuration operations by NIVM 180, authentication coordinator 182, or other control elements of the provider network.

After the authentication coordinator obtains an IR 170 to be used to authenticate a service 102, the authentication coordinator may assign the IR 170 to a service 102, or to a portion of a service. Such an assignment may be implemented, for example, by modifying the IR to point to a service record 144 for the service 102, or by including an identifier of the service 102, or one or more properties of the service 102, within the IR 170. In some embodiments the authentication coordinator 182 may send a request to the NIVM 180 to assign the IR 170 to the service. The authentication coordinator 182 may then configure the IR 170 to enable a client 148 to request that the IR be attached to a resource instance (such as a consumer resource instance 125, or a producer resource instance 120). Attach permissions of an IR may be modified directly by the authentication coordinator 182 in some embodiments, while in other embodiments the configuration change to the IR may be performed by the NIVM 180 in response to another request 157 from the authentication coordinator 182. In some implementations the provider client 148 may provide an identification of the specific resource instance to which attach permission is to be granted in a request 151 to the authentication coordinator. In other implementations the permissions of the IR may be set such that a consumer client 148 may later send an attachment request via a communication 155 to the NIVM.

After attach permissions have been set for the IR 170 to be used for authentication of a service 102, the authentication coordinator may inform the corresponding producer client 148 that the IR is available. Depending on the authentication mode in use, the IR 170 may then be attached, either to a consumer resource instance 125 from which requests for the service are expected, or to the producer resource instance 120. If a "Check Request" authentication mode is to be enforced, the IR 170 may be attached to a consumer resource instance 125, e.g., in response to a request 155 from a client 148 or in response to a request 154 from a consumer resource instance 125 of the client. After the attachment operation is complete (i.e., after the networking configuration changes initiated or performed by the NIVM to implement the attachment are in effect), an IP address associated with the IR 170 becomes the source address of network traffic flowing from the attached instance through a NIC 123 of the platform 150 where the instance is running. The IP address also becomes the target address for traffic directed to the instance. Subsequently, when a request for the service 102 is received at the producer resource instance 120, before the requested operations are performed, the source IP address of the request may be checked to verify that the request originated at an IP address of an interface record that is assigned to the service 102. If the request did not originate from an IP address of an IR assigned to the service, the request may be rejected.

If a "Call Home" authentication mode is to be enforced, the IR may be attached to the producer resource instance 120 providing the service, e.g., in response to a request 155 from a producer client, or a request 153 originating at the producer resource instance 125. In the "Call Home" scenario, the producer resource instance may periodically or at specified times send a service continuation request, either to the authentication coordinator 182, or to another destination specified by the provider client 148. If the service continuation request (received for example at the authentication coordinator 182 via a communication labeled 152 in FIG. 1) is found to have been sent from an IP address associated with an IR 170 that is assigned to the service, further provision of the service 102 from the resource instance 120 may be approved; otherwise, further provision of that service 102 may be disabled. In either authentication mode, the producer resource instance may thus initiate or perform one or more authentication operations based on the IP address of the IR assigned to the service. Other authentication operations, such as for example a verification of a validity of a license associated with the service to which the IR 170 is assigned, may also be initiated by the producer resource instance 120 in some embodiments.

In one embodiment, the client 148 may be granted detach permission on the IR 170, in addition to the attach permission as described above. In such an embodiment, the client 148 may transfer the IR 170 from one resource instance to another as desired, and thereby also transfer the authentication-related properties of the IR from one instance to another. For example, at some point in time after the IR 170 assigned to the service 102 is attached to a resource instance, the client may first send a detachment request for the IR to the NIVM 180, and then send another attachment request. In response to the detachment request, the NIVM 180 may initiate or perform the networking configuration changes required to disable the flow of traffic directed to or from the IR's IP address through a NIC 123 of the platform 150 where the instance runs. In response to the request for the attachment of the IR 170 to a different resource instance, the NIVM 180 may initiate or perform the networking configuration changes to enable traffic directed to/from the IRs' IP address to flow through a NIC 123 of the platform where the different instance runs. As a result of such a detach/attach combination, access to the service 102 to which the IR 170 is assigned is passed on to the newly-attached resource instance. If the "Check Request" authentication mode is in use, service requests issued from the newly-attached instance will pass the IP address authentication checks at the producer of the service 102. If the "Call Home" authentication mode is in use, the service continuation requests submitted from the newly-attached instance will pass the producer IP address authentication check described above.

In response to an attachment request received from a client 148, in one implementation the NIVM 180 may perform some or all of the following operations: (a) validate, based on the security information stored in the specified interface record 170 and/or elsewhere, that the client is authorized to request the attachment of the interface record with the specified resource instance 125 or 120; (b) verify that the networking information (IP address or addresses, subnet identifier, etc.) of the interface record is appropriate for activation of network traffic to and from the specified resource instance (e.g., the NIVM 180 may check whether an IP address is already in use for another instance and therefore is unavailable); (c) ensure that a physical NIC 123 is operational and available for use by the resource instance at the platform 150 where the resource instance is currently resident; (d) initiate or make the necessary configuration changes, e.g., in hypervisor or operating system software running at the platform 150 and at the appropriate routers, gateways and other network devices of the provider network, to allow the specific resource instance to begin to send traffic from, and receive traffic at, the IP address or addresses specified in the interface record; and (e) make changes to the interface record 170 and/or interface record repository 185 to reflect the attach operation performed. As part of the configuration changes, new or modified routing information such as routing table entries may be propagated to a set of routers, gateways, and the like in some implementations. In one embodiment the NIVM 180 may ensure that each resource instance has at least one interface record 170 attached to it whenever the resource instance is activated or brought up.

In response to a detachment request from a client 148, the NIVM 180 may prohibit further traffic directed to or from the IP address or addresses specified in the interface record 170 from flowing to or from the resource instance. In order to do so, the NIVM 180 may perform some or all of the following operations: (a) validate, based on the security information stored in the specified interface record 170 and/or elsewhere, that the client is authorized to request the detachment of the interface record from the specified resource instance; (b) initiate or make the necessary configuration changes, e.g., within hypervisor or operating system software running at the platform 150 and at the appropriate routers, gateways and other network devices, to prevent network traffic associated with the IP address(es) of the interface record 170 from flowing to or from the specified resource instance and (c) make changes to the interface record 170 and/or interface record repository 185 to reflect the detach operation performed. In many embodiments multiple interface records 170 may be attached to a single resource instance 120 or 125, thus allowing multiple IP addresses to be used for the same resource instance. In one embodiment multiple IP addresses (e.g., one or more "private" IP addresses usable for access only within a subset of the provider network such as a logically-isolated network described earlier, and one or more "public" IP addresses that may be accessible from the public Internet) may be associated with the interface record, and one or more of those addresses may be usable for the authentication checks described above. Using the various features and capabilities of interface records described above, a highly flexible mechanism for managing service authentication may be implemented in various embodiments.

Example Constituent Elements of Interface Records

Figure 2:
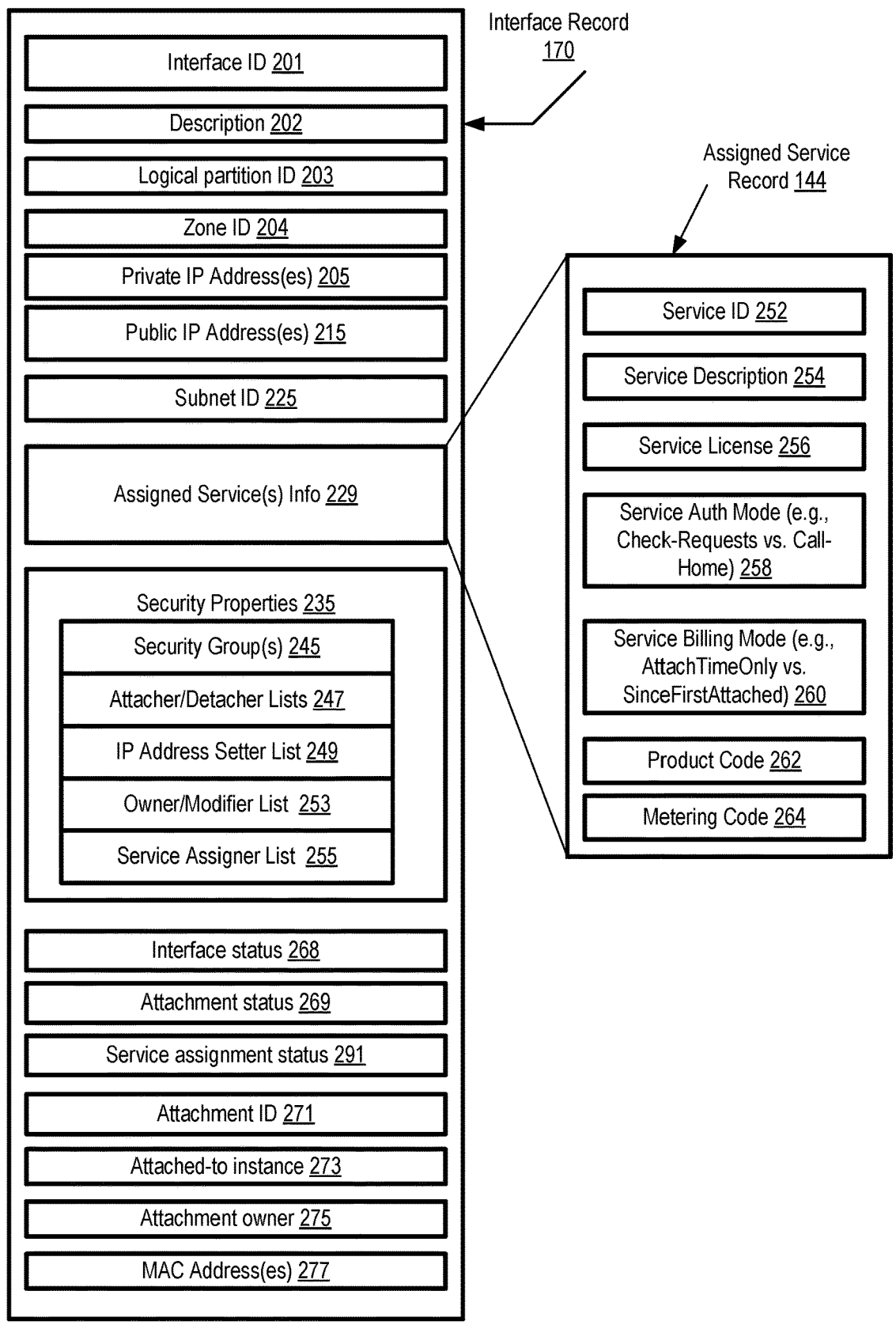
FIG. 2 illustrates examples of constituent elements of an interface record, according to at least some embodiments.

FIG. 2 illustrates examples of the constituent elements of an interface record 170, according to at least some embodiments. Only a subset of the elements or fields shown in FIG. 2 may be implemented in some implementations, and not all the implemented fields may have to be populated (i.e., some of the fields may be left blank or null) at any given time. When an IR 170 is created, a new interface identifier 201 may be created for it by the NIVM 180. In some implementations, a description field 202 may be filled in by authentication coordinator 182 or a client 148 that requested the interface record creation, e.g., "Interface #1 for authenticating content management service X". As described earlier, a provider network in which the interface record is to be used may comprise a plurality of logically-isolated networks (e.g., "virtual private clouds") in some embodiments, and the interface record 170 may contain a logical partition identifier 203 to identify the logically-isolated network in which the interface record is to be used. In some cases the interface record 170 may include a zone identifier 204, which may for example indicate a geographical region or set of data centers whose platforms 150 may be available for attachment to the interface record 170.

Any of several types of network addressing-related fields may be included within an interface record 170 in different embodiments. One or more private IP addresses 205 may be specified in some embodiments; these IP addresses may be used internally for routing within the provider network, and may not be directly accessible from outside the provider network. One or more public IP addresses 215 may also be included in some embodiments; these IP addresses may be visible outside the provider network, e.g., to various routers of the public Internet or peer networks of the provider network. Various devices or components, including for example components of NIVM 180, may implement any desired network address translation technique or techniques to translate between public IP addresses 215 and private IP addresses 205 in various embodiments as needed. One or more subnet identifiers 225 may be included within an interface record, identifying (in the case of networks where the Internet Protocol is used) a set of logical or physical devices that may be addressed with a common, identical, most-significant bit-group in their IP address. For example, in CIDR notation, 10.1.1.0/24 is the prefix of an Internet Protocol Version 4 (IPv4) subnet starting at the address 10.1.1.0, having 24 bits allocated for the network prefix, and the remaining 8 bits reserved for device identification. In IPv4 the routing prefix may also specified in the form of the subnet mask, which is expressed in quad-dotted decimal representation like an address. For example, 255.255.255.0 is the network mask for the 10.1.1.0/24 prefix. Different notation may be used for IP Version 6 networks and for networks that use protocols other than the TCP/IP suite. Subnets may be used in general for a variety of reasons—for example to provide logical isolation between different sets of network-addressable devices, to arrange the resources of a logical partition (such as a virtual private cloud) into hierarchies for easier administration, and so on. A subnet identifier 225 included within an interface record 170 may comprise, in some implementations, a string that may in turn include or encode the CIDR representation for the subnet—e.g., "subnet-df543fda-10.1.1.0/24".

An IR 170 may in some embodiments contain information 229 about the service or services 102 to which it is assigned, and for which it is to be used to provide the authentication-related capabilities described above. In some implementations, assigned service information 229 may comprise one or more pointers to service records 144 which may be stored in another repository (such as service record repository 186 shown in FIG. 1); in other implementations information similar to the contents of service records 144 may be stored within the IRs themselves. A service record 144 may comprise a service identifier or name 252 and a service description field 254 in the depicted embodiment. A service license 256 may be stored within, or pointed to from, a service record 144; for example, a universally unique identifier (UUID) license may be stored in field 256, or the contents of an encrypted license file may be stored therein. In some implementations license field 256 may comprise a license expiration date or time.

In one embodiment, a service record 144 may comprise an authentication mode field 258. Such a field may indicate whether the service is to be authenticated by checking service requests (the "Check Requests" mode), by periodically sending service continuation requests (the "Call Home" mode), or any other supported authentication mechanism (such as a hybrid scheme in which service requests are checked and service continuation checks are also used). In addition to the identification of the authentication mode to be used, authentication mode field 258 may also contain or point to parameters of the authentication mechanism in some embodiments, e.g., how frequently service continuation requests are to be sent, how often service requests are to be authenticated via source IP address validation, and so on. Possible choices for the frequency with which service request IP addresses are to be validated may include, for example, (a) at the start of every user session or connection establishment (b) only on the first access after service initialization (c) checking every service request (d) checking at least one request every hour or every minute.

Service record 144 may also include billing mode information 260 in some embodiments. For example, if an "AttachTimeOnly" billing mode is used, a client 148 may be billed based at least in part on the amount of time that client's resource instances 120 or 125 were attached to an IR 170 that was assigned to the service. If a "SinceFirstAttached" billing mode is used, the client 148 may be billed based at least in part on all the time that has elapsed since that client's resource instances were first attached to an IR 170 that was assigned to the service. Other billing modes may be used in some implementations. In some embodiments the service record 144 may also include one or more product code fields 262 and one or more metering codes 264. Product codes may in some cases serve as identifiers of service components for licensing and billing purposes in some implementations—e.g., after a software product is installed on a given resource instance, the subset of its functionality that is accessible to a consumer may depend on the product codes for which the consumer has agreed to pay. Metering codes may be used to associate resource usage information (e.g., network bytes transferred) with services 102 or their components, and may also be used for billing purposes, e.g., in implementations where a client may be charged a billing amount proportional to resource usage (such as network bytes transferred or CPU cycles consumed).

In some embodiments the interface record 170 may include one or more security-related properties 235. Some provider networks may allow users to specify rules, including for example firewall-related rules, for the types of incoming and/or outgoing traffic allowed at resource instances to which an interface record 170 may be attached; such rules may be termed "security groups" and identified via security group(s) fields 245. Various port and protocol restrictions may be enforced using such rules, and multiple rules may be associated with each interface record. For example, a user may use security groups to ensure that only HTTP and HTTPs outgoing or incoming traffic is allowed, to limit the set of TCP or UDP (User Datagram Protocol) ports to which traffic is permitted, to filter incoming and outgoing traffic according to various policies, and so on. In some implementations one or more attacher/detacher lists 247 may be specified, indicating which clients, users or entities are allowed to request attachments and/or detachments of the interface record 170 to resource instances. In some cases a separate detacher list may be used to specify which entities can detach the interface record 170, while in other cases a single list may be used to identify authorized attachers and detachers. The set of users or entities that are allowed to set or modify IP addresses (e.g., public IP addresses 215 and/or private IP addresses 205) of the interface record 170 may be provided in IP address setter list 249. The set of users or entities that are allowed to request assignment of the IR to a service may be provided in a service assigner list 253 in some implementations; in other implementations only the NIVM 180 or the authentication coordinator 182 may be permitted to request service assignments, and there may be no need for a separate service assigner list. The set of users or entities that own (or can modify various other fields of) the interface record 170 may be specified in owner/modifier field 253 in some embodiments. For example, an owner/modifier identified in field 253 may be permitted to change an attacher list 247 or the IP address setter list in some implementations, thus changing the set of entities permitted to attach or detach the interface record or modify its IP address(es). While the term "list" has been used for various fields of IR 170, logical data structures other than lists (such as arrays, hash tables, sets and the like) may be used to represent the groups of entities given various security privileges, roles and/or capabilities in various embodiments.

An interface status field 268 may be used to indicate a current state of the interface record 170 in some embodiments—e.g., whether the interface record is "available", "disabled", or "in-repair". Similarly, an attachment status field 269 may be used to indicate whether the interface record 170 is currently attached, detached or in the process of being attached or detached in some embodiments. In one implementation, a record of an attachment (separate from interface record 170) may be created at the time the corresponding attachment operation is performed, and an identifier or identifiers of the current attachments of the interface record 170 may be stored in attachment id field 271. Service assignment status (e.g., indicating whether the IR is attached to one or more services currently) may be stored in field 291. Identifiers of the resource instance or instances 120 or 125 to which the interface record 170 is currently attached may be stored in attached-to instance field 273, and the user or entity that requested the attachment may be identified via attachment owner field 275 in some embodiments. In one embodiment, a list of identifiers of the NIC or NICs 110 currently usable for traffic directed to/from the IP addresses of interface record 170 may be maintained, e.g., in the form of a MAC address(es) field 277. Various other fields not shown in FIG. 2 may be included in interface records 170 in different embodiments. In some embodiments, for example, clients may associate tags, such as a virtual local area network (VLAN) tag formatted in accordance with a VLAN standard (such as the 802.1Q standard) with interface records 170 to implement network isolation. In such embodiments such a tag may also be stored in, or referenced from, the interface record 170.

In one embodiment, as noted above with respect to assigned service information 229, some of the fields shown in FIG. 2 may be replaced by references or pointers to other objects. For example, security information for an interface record 170 may be stored in a separate security object, and the interface record 170 may store a reference to the security object. Similarly, each attachment of a resource instance 120 to an interface record 170 may be represented by an attachment object, and the interface record may point or refer to the appropriate attachment object in some implementations. External objects such as service records 144, security objects, attachment objects and the like may include pointers or references back to the associated IRs.

Setup/Initialization of Service Authentication

Figure 3:
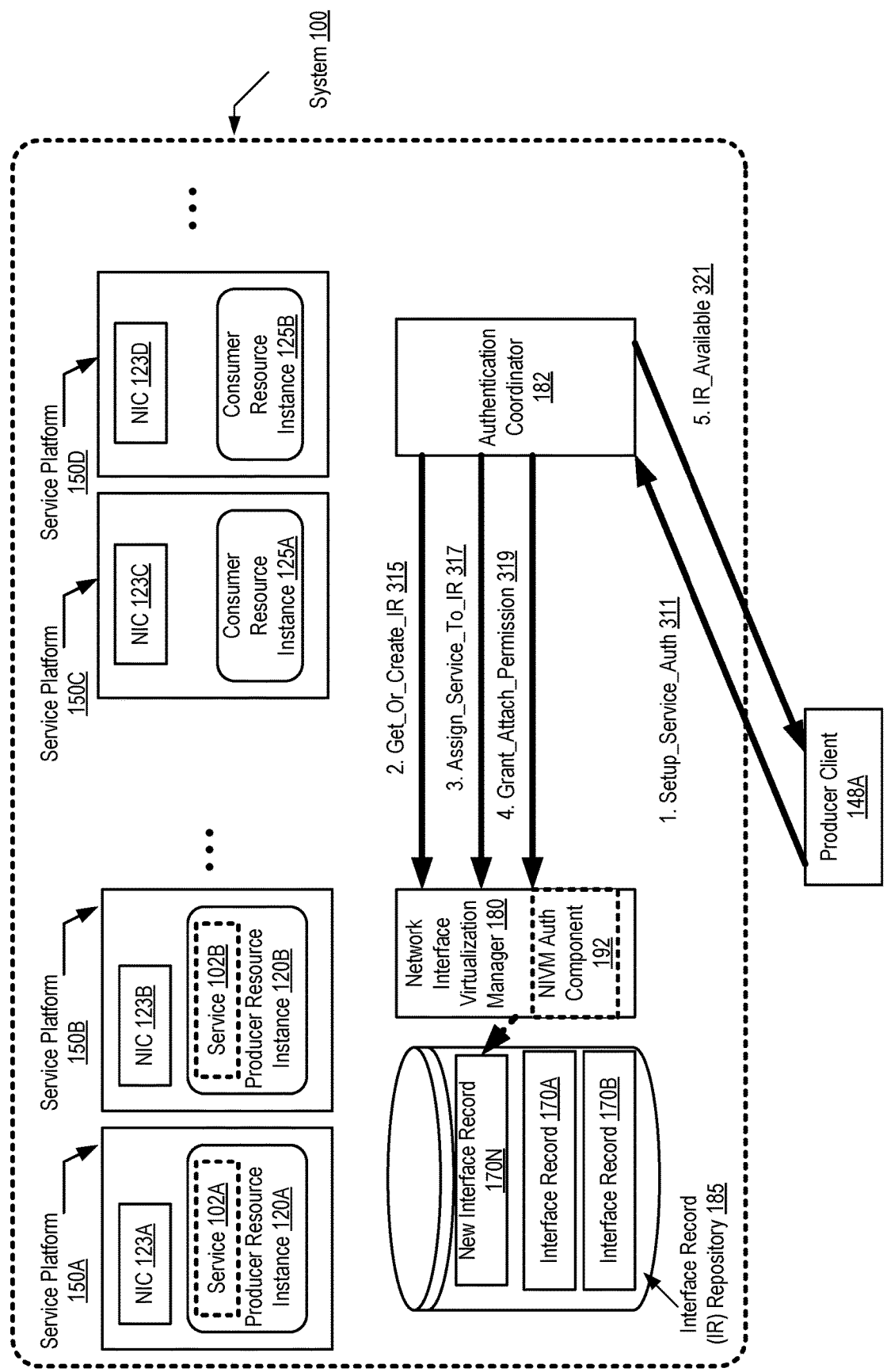
FIG. 3 illustrates an operation in which a producer client sets up service authentication with the help of an authentication coordinator, according to some embodiments.

FIGS. 3-8 illustrate examples of several types of service authentication operations supported by authentication coordinator 182 and/or NIVM 180 in various embodiments. FIG. 3 illustrates an operation in which a producer client 148A sets up authentication for service 102B with the help of authentication coordinator 182, according to some embodiments. The producer client 148A may send a "Setup_Service_Authentication" message or request 311 to the authentication coordinator 182, identifying the service 102B for which authentication using IRs is to be set up. In some embodiments the setup message may include additional information such as an identification of the authentication mode to be used, the producer resource instance 120B from which the service 102B is to be provided, consumer resource instances from which the service is to be utilized, and so on.

In response to the setup request 311, the authentication coordinator 182 may obtain or create an interface record to be used for authenticating the service. For example, in some embodiments the authentication coordinator 182 may send a "Get_Or_Create_IR" request 315 to the NIVM 180. Depending on implementation details, the NIVM 180 may either instantiate a new IR 170N, or reuse an existing IR 170 that is currently not in use. The authentication coordinator may then send an "Assign_Service_To_IR" request 317, requesting that the IR be assigned to the service 102B, followed by a "Grant_Attach_Permission" request 319, requesting that the security properties of the IR 170 (such as the attacher/detacher list or lists 247 shown in FIG. 2) be set in accordance with the setup request 311. After the IR 170 has been obtained or created, assigned to the service 102B, and configured to allow the appropriate instances 120 or 125 to be attached depending on the authentication mode to be used, the authentication coordinator 182 may send an "IR_Available" message 321 back to the producer client 148A, comprising the information (such as the identifier of the IR 170) needed by the client to start authenticating service requests and/or service provision.

While the authentication coordinator is shown as a separate entity in FIG. 3, in some embodiments a subset or all of the functionality illustrated via the interactions (e.g., interactions 311, 315, 317, 319, and 321) shown in FIG. 3 may be implemented by an NIVM auth component 192 of NIVM 180. For example, client 148A may send a setup message to NIVM auth component 192, and the auth component may obtain an IR, assign it to a specified service, set attach/detach permissions appropriately, and respond to the client 148A. In one embodiment, some subset or all of the interactions 315, 317 and 319 may be combined into a single request or message from the authentication coordinator 182 to NIVM 180. In one implementation, a request to setup service authentication may originate at the producer resource instance 120 from where the service 102 is being provided; i.e., producer resource instance 120B may send request 311 and receive the corresponding response 321. In some embodiments clients 148 may set up service authentication even before any instances have been instantiated to provide the service, and may for example keep a pool of IRs available for attachment to instances in advance of service instantiation, thereby reducing the overhead that may otherwise be incurred in interacting with the authentication coordinator 182 or NIVM authentication component 192 during service bringup. At the time that IRs 170 are created/configured for service authentication, their IP addresses may not necessarily be assigned in some cases; instead, permissions to set the IP addresses may be granted to the appropriate clients 148, so that the clients may determine and set the IP addresses to be used for authentication purposes at their convenience.

Interface Record Use for Service Request Checking

Figure 4:
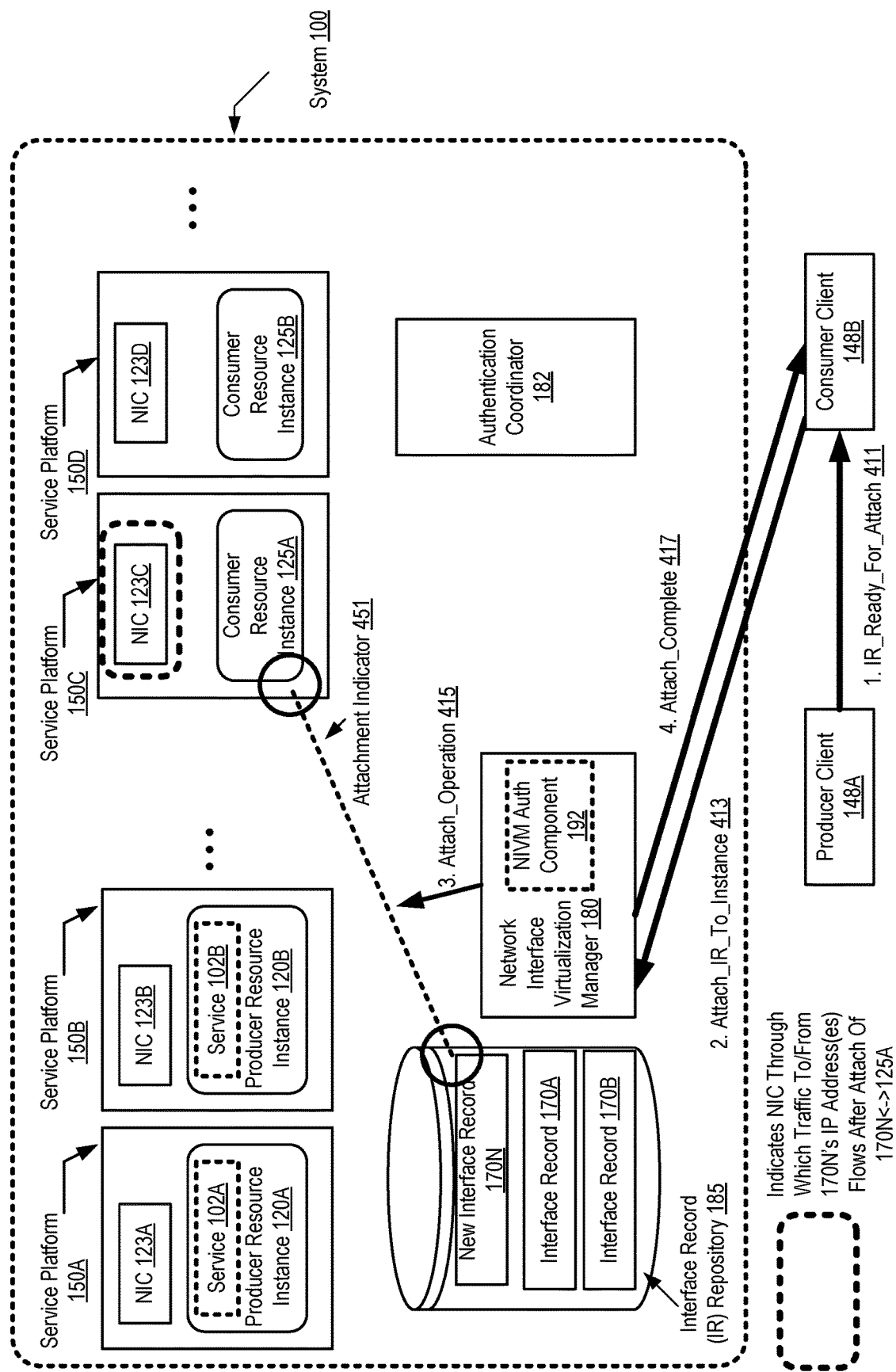
FIG. 4 illustrates an operation in which an interface record is attached to a consumer resource instance, according to some embodiments.

FIG. 4 illustrates an operation in which an interface record 170N is attached to a consumer resource instance 125A to implement the "Check Request" authentication mode described earlier, according to some embodiments. After a producer client 148A has set up authentication for a service 102B as illustrated in FIG. 3, the producer client 148A may send an "IR_Ready_For_Attach" message 411 to a consumer client 148B that is to use the service from its consumer instance or instances. Attach/detach permissions and/or IP address change permissions on the IR 170N may have been granted to the consumer client 148B prior to the producer client sending message 411 in the illustrated embodiment. In addition to the identification of the IR 170N to be used to access the service 102B, additional details regarding service access, such as the IP addresses of a producer resource instance 120B where the service is to be obtained may be provided to the consumer client 148B by producer client 148A, either in IR_Ready_For_Attach message 411 or in another message or messages. Upon receiving the message 411, the consumer client 148B may select the consumer resource instance 125A from which the service 102 is to be accessed using the IR 170N, and send an attachment request in an "Attach_IR_To_Instance" message 413 to NIVM 180. In some implementations, if the IP address(es) of the IR 170N have not been set already, the consumer client 148B may include an IP address setting request in message 413. In one embodiment, instead of sending the "Attach_IR_To_Instance" message to the NIVM 180, the consumer client 148B may send the message to the authentication coordinator 182, which may relay the request to the NIVM on its behalf.

The NIVM 180 may perform the requested attachment operation 415, and notify the consumer client 148B that the attachment is complete, via an "Attach_Complete" message 417. In some implementations the NIVM 180 may also notify the producer client 148A that an attachment to a consumer resource instance 125 has been completed. The attachment of the IR 170N to consumer resource instance 125A is illustrated by the dashed line attachment indicator 451 in FIG. 4. As a result of the attachment, consumer resource instance 125A may begin sending service requests to the producer resource instances 120B from an IP address associated with the IR 170N. The producer resource instance (e.g., using instance authentication component 172 shown in FIG. 1) may begin to check the IP addresses of service requests to validate that the requests were sent using an IR that is assigned to the service 102B. The frequency with which requests are checked (e.g., whether each request is checked, or requests are checked periodically or once per session) may depend on the details of the authentication mode being used, as described earlier. If a request passes the authentication test, the requested service operation or operations may be provided. If the IP address of the sender does not match the addresses of any IRs assigned to the service 102B, the producer resource instance 120B may take any of a number of different actions in various embodiments. In some cases, the failing requests may simply be ignored. In other embodiments, a notification of the failure may be sent, e.g., to authentication coordinator 182 or to the producer client 148A, and/or the service 102B may be suspended or shut down. In addition to checking IP addresses, service request authentication may be based on other criteria as well in some embodiments, such as checking the validity of a license associated with the service.

Figure 5:
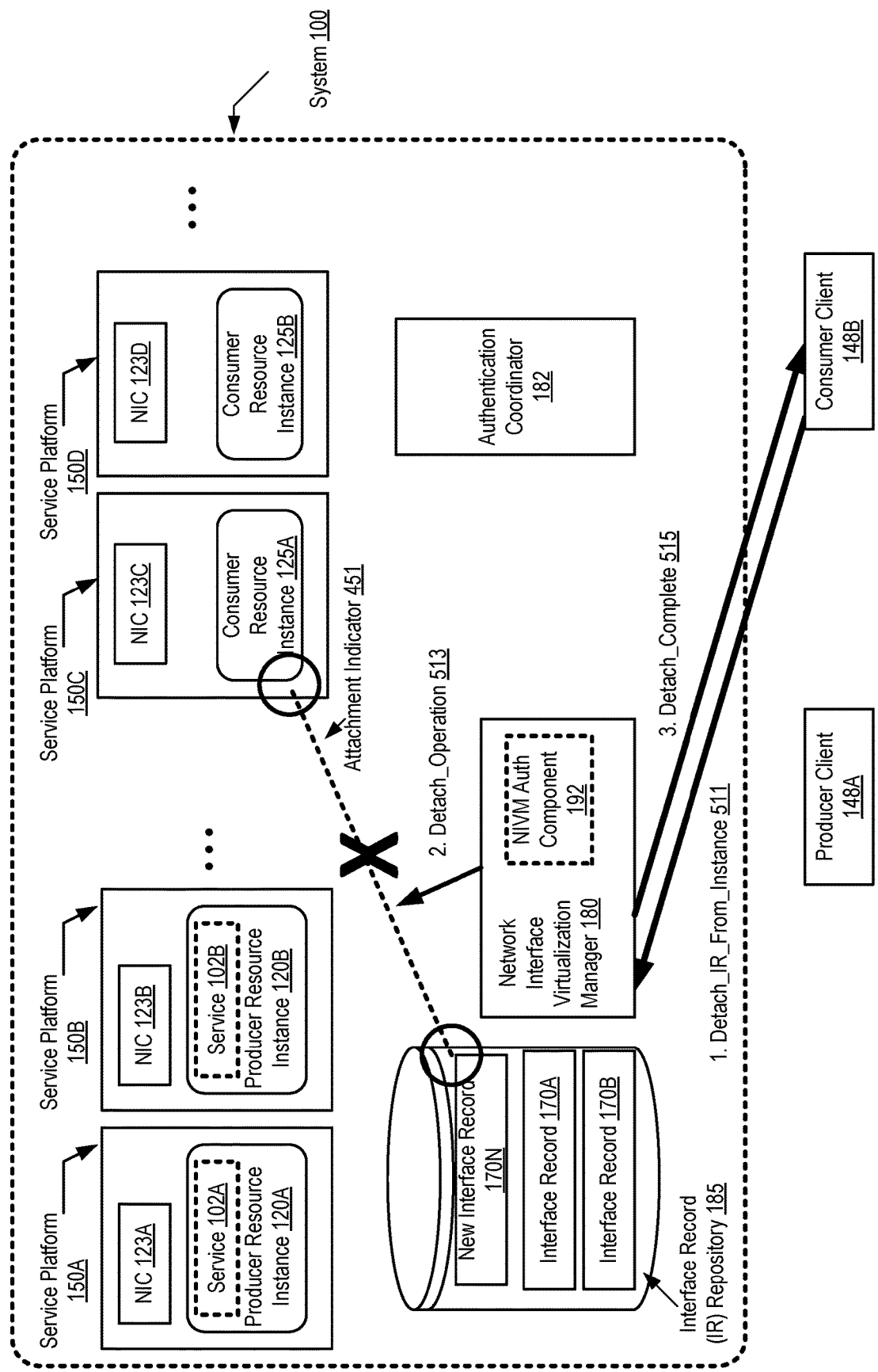
FIG. 5 illustrates an operation in which an interface record is detached from a consumer resource instance, according to some embodiments.

In some embodiments, the security settings of an IR 170N to be used for authenticating requests for service 102B may be configured to allow the consumer client 148B to detach the IR 170N from one consumer resource instance and attach it to another (or re-attach it to the same instance, as needed). FIG. 5 illustrates an operation in which an interface record 170N is detached from consumer resource instance 125A, according to some embodiments. The consumer client 148B may wish to transfer the ability to access service 102B from one consumer instance to another for various reasons. For example, the instance 125A form which service requests were being sent may need to be upgraded, and may therefore be deactivated during a maintenance window; or a more powerful consumer resource instance may be needed to handle the consumer-side workload. There may also be billing-related reasons for a consumer client to transfer service access capabilities from one instance to another, or to disable service access temporarily—e.g., a less expensive type of virtual compute server instance may have become available to the consumer client, or the client may not wish to pay for the service for a time period during which no service requests may be generated. To disable service access from instance 125A in the illustrated embodiment, the consumer client 148B may send a "Detach_IR_From_Instance" message 511 to NIVM 180 (or to authentication coordinator 182, which may forward the request on to the NIVM 180) comprising a detachment request. On receiving the detachment request, the NIVM 180 may initiate or perform the necessary networking configuration changes to disable the use of the IP address(es) of the IR 170N for traffic to/from the resource instance 125A to which the IR was attached, as indicated by the "X" and the detach operation 513 shown in FIG. 5.

Figure 6:
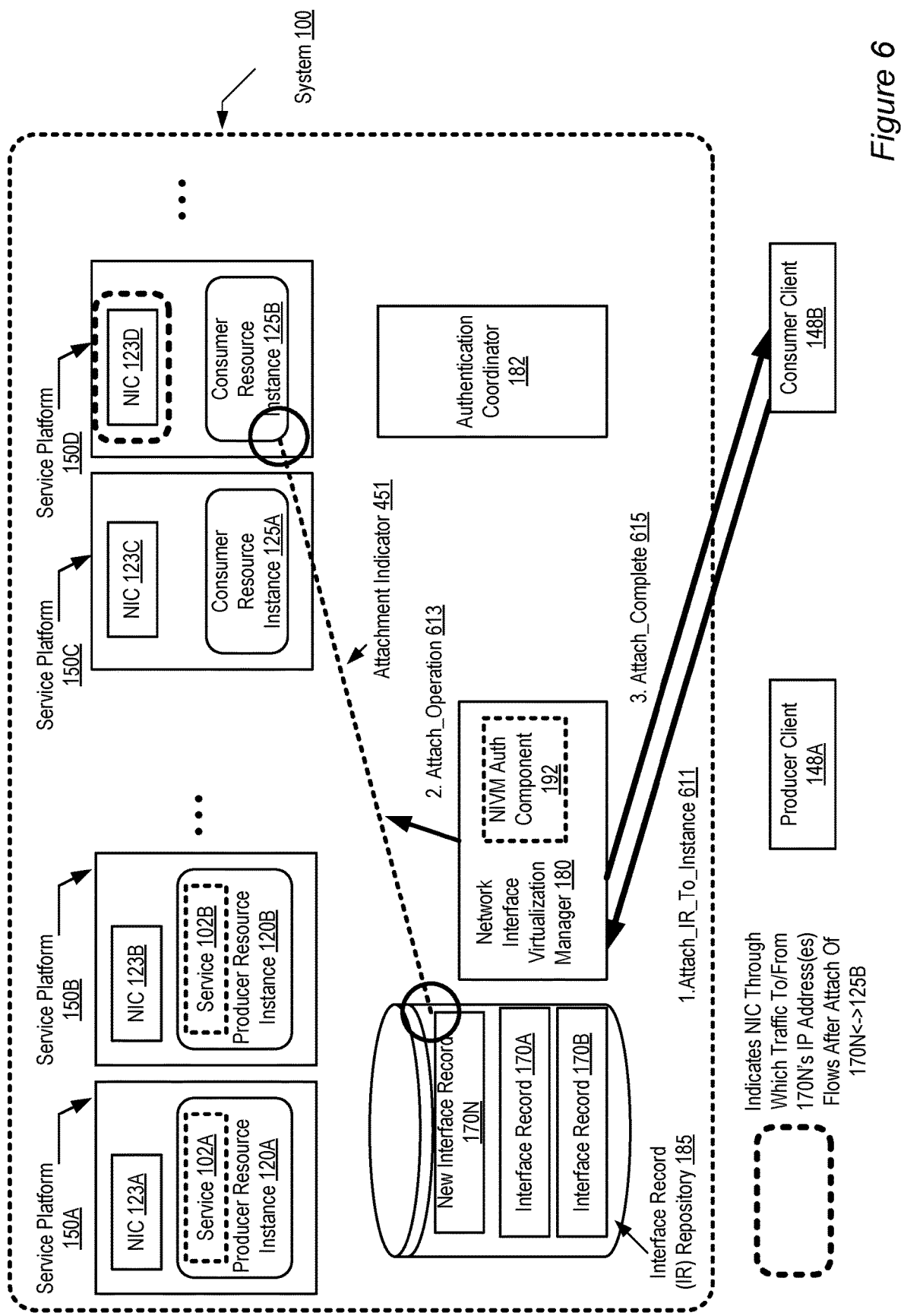
FIG. 6 illustrates an operation in which an interface record that was previously detached from one consumer resource instance is attached to another consumer resource instance, according to some embodiments.

After the IR 170N has been detached, it may retain its service assignment properties—i.e., the ability to use the service(s) to which the IR was assigned may be passed on to any resource instance to which it is attached later. FIG. 6 illustrates the attachment of the IR 170N, that was previously detached from consumer resource instance 125A, to a different consumer resource instance 125B, according to some embodiments. Consumer client 148B may send a new "Attach_IR_To_Instance" message 611 to NIVM 180, indicating that the IR 170N should now be attached to instance 125B. On receiving the attachment request, NIVM 180 may perform similar operations as those illustrated in FIG. 4, this time attaching the IR 170N to consumer resource instance 125B, and indicate to the requesting client 148B that the requested attachment has been completed via an "Attach_Complete" message 615. As a result, requests for service 102B originating from consumer resource instance 125B may indicate the IP address of IR 170N as the source IP address. When producer resource instance 120B checks a service request from consumer instance 125B, the IP address of the requester would be found acceptable, because the address is associated with an IR that is assigned to the service. In some embodiments, the consumer client 148B may change the IP address(es) associated with the IR as needed (i.e., the consumer instances 125A and 125B may use different IP addresses); as long as the IR remained assigned to service 102B, requests originating from any instance attached to the service would pass the IP address authentication check. In one implement, a single message may combine the requests for detachment and attachment.

In some implementations, consumer clients 148B may be granted permission to reassign interface records to different services or service instances—e.g., after detaching an IR being used from one consumer instance 125A to access one service 102B, that same IR may be assigned to another service 102A, and then attached to any desired resource instance 125B, allowing requests from instance 125B for the service 120B to pass authentication checks. In other implementations, consumer clients 148B may not be granted detach or re-attach permissions—e.g., a consumer client wishing to transfer service access to another instance may need to obtain a new IR, or to send a request to the producer client 148A to transfer service access.

Producer-Side Authentication Using Interface Records

Figure 7:
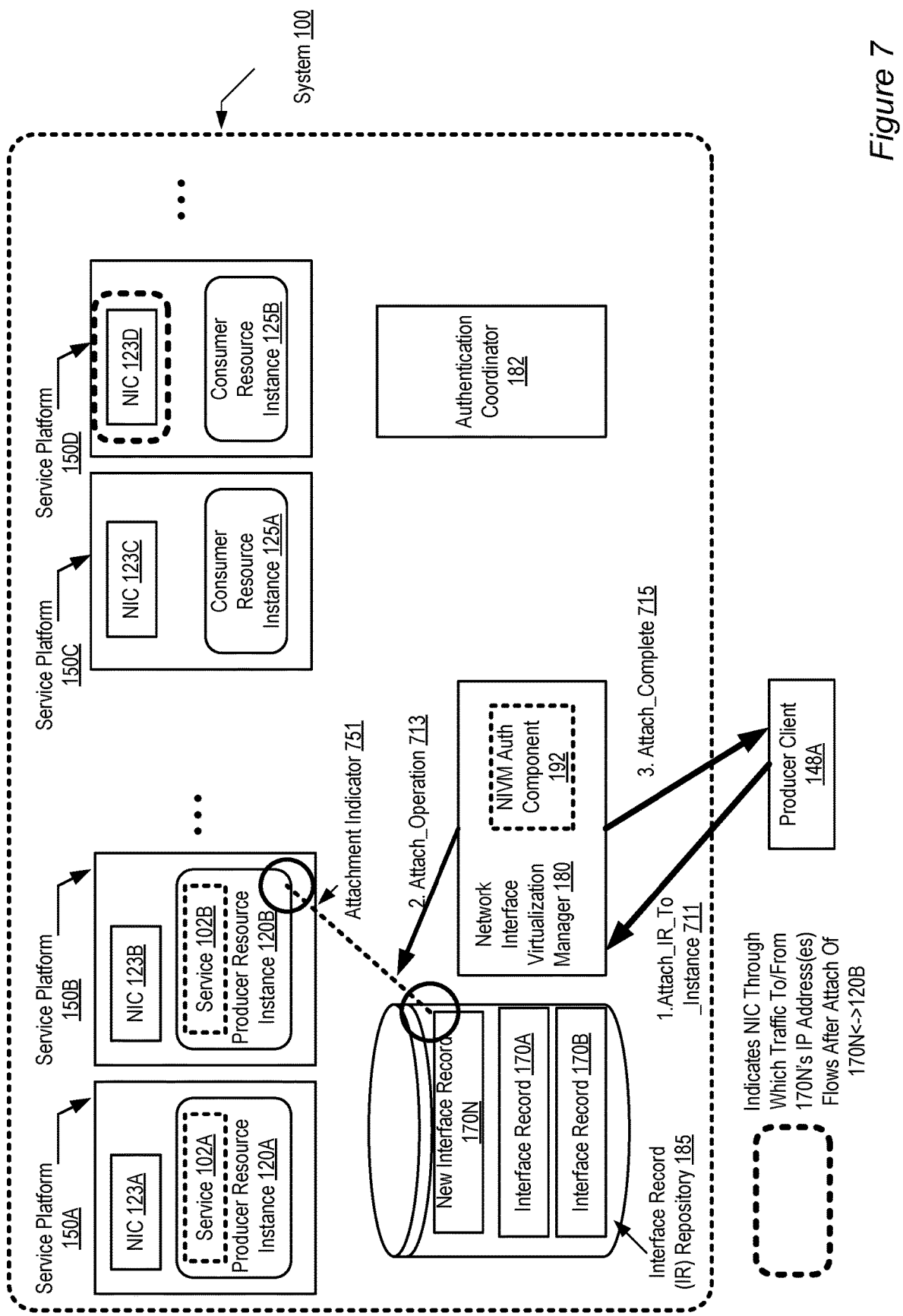
FIG. 7 illustrates the attachment of an interface record to a producer resource instance, according to some embodiments.

FIGS. 4, 5 and 6 illustrated examples of interactions and operations of the "Check Requests" authentication mode. FIG. 7 illustrates the attachment of an IR 170N to a producer resource instance 120B to implement the "Call Home" authentication mode, according to some embodiments. In the "Call Home" mode, as described earlier, a producer resource instance 120 may send service continuation requests to an authentication coordinator or to some other specified entity, in effect asking the receiver of the request to make a determination as to whether a service should continue to be provided from the producer resource instance. Just as the IP address of a service requester is checked in the "Check Requests" mode, the IP address of the service provider may be checked in the "Call Home" mode.

In order to implement the "Call Home" mode, the producer client 148A may first interact with an authentication coordinator 182 as illustrated in FIG. 3, to obtain access to an IR 170N, assign the IR to a service 102B, and configure attach/detach permissions of the IR. The producer client 148A may then send an "Attach_IR_To_Instance" message 711 to NIVM 180, as shown in FIG. 7, comprising a request for an attachment of a producer resource instance 120B to the IR 170N. In response, the NIVM 180 may attach the specified instance 120B to the IR 170N, as shown by the attachment indicator 751, and send an "Attach_Complete" message 715 back to the requesting producer client 148A.

The producer resource instance 120B may then send service continuation requests, e.g., to authentication coordinator 182 or to another destination chosen by the producer client 148A to act as the entity that determines whether the service is to continue. The decision as to whether to continue provision of the service 102B may be based at least in part on verifying that an IP address from which the service continuation request was sent is associated with an IR 170 that is assigned to the service 102B. In some implementations, service continuation requests may be sent periodically (e.g., once an hour), based on a parameter associated with the service 102B. In other implementations, a service continuation request may be sent after every N service requests have been handled at the producer resource instance, or at randomly-selected intervals. In addition to checking IP addresses, service continuation decisions may be based on other criteria as well in some embodiments, such as checking the validity of a license associated with the service 102B.

Terminating Service Access Using Interface Records

Figure 8:
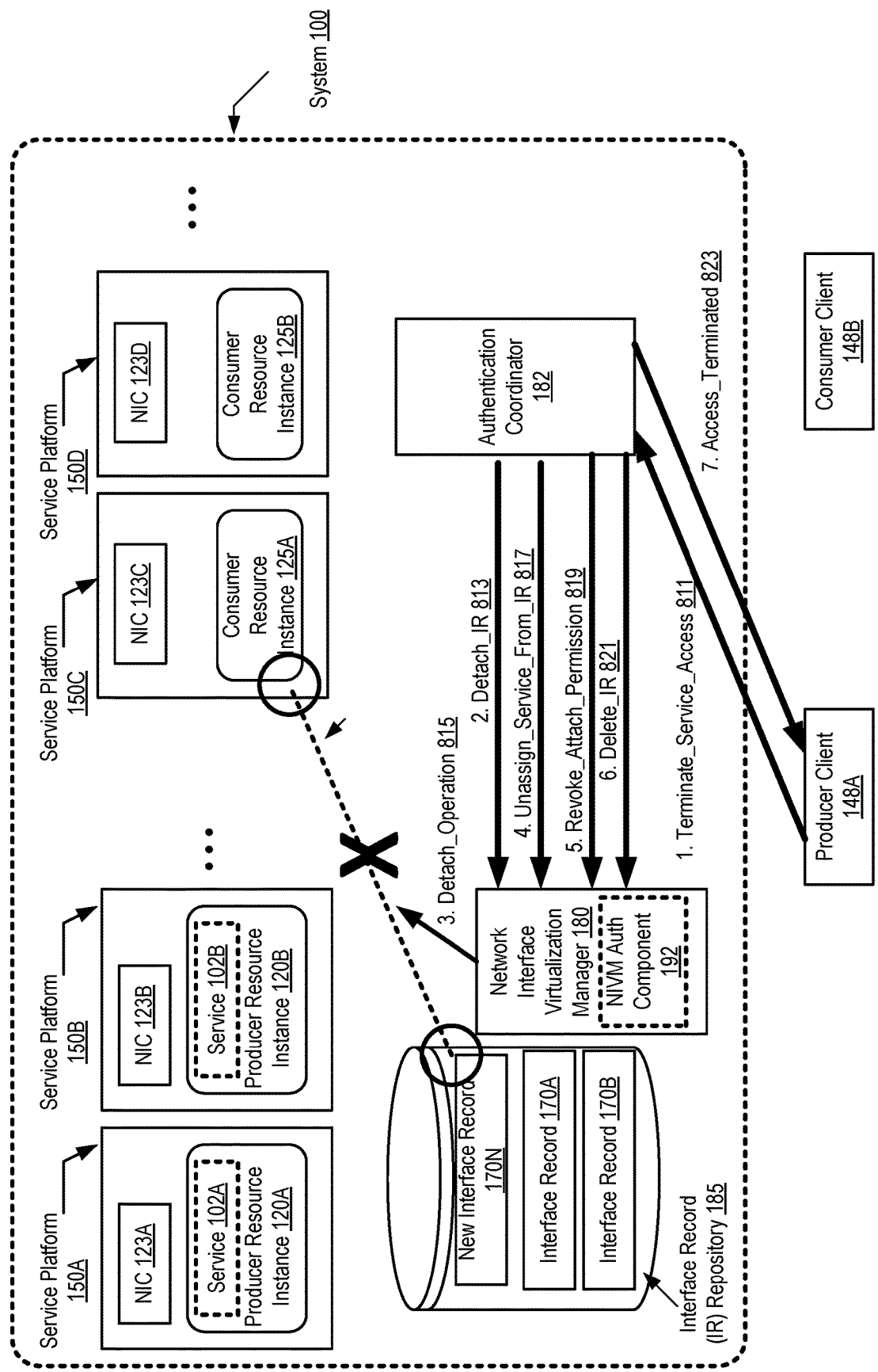
FIG. 8 illustrates examples of interface record operations that may be initiated by a producer client to terminate or suspend access to a service, according to some embodiments.

A producer client may decide to terminate service provision to a given set of consumer resource instances, or from a set of producer resource instances, for a number of reasons, such as an expiration of a license associated with the service, non-payment of bills by a consumer client, and the like. FIG. 8 illustrates examples of IR operations that may be initiated by a producer client 148A to terminate or suspend access to a service 102B, according to some embodiments.

As shown, the producer client 148A may send a "Terminate_Service_Access" request 811 to authentication coordinator 182 in the illustrated embodiment, indicating for example the service to which access is to be denied, the IRs 170 that are assigned to the service, and/or the resource instances 120 or 125 that are attached to instances assigned to the service. In response, the authentication coordinator 182 may perform one or more of the following operations in various implementations. The authentication coordinator 182 may request a detachment of specified IRs from the resource instances, e.g., in a "Detach_IR" request 813 sent to NIVM 180. The service 102B may be disassociated from the specified IRs, e.g., as a result of an "Unassign_Service_From_IR" request 817 sent to the NIVM 180. Attach/detach permissions for the resource instances currently using or implementing the service may be revoked in accordance with a "Revoke_Attach_Permissions" request 819 in some implementations. In some environments the IRs assigned to the service may simply be deleted, e.g., in response to a "Delete_IR" request 821. The specific combination of the above actions to be taken to terminate or suspend access to the service may be based on service properties maintained in service records 144 in some implementations. In some embodiments, the "Terminate_Service_Access" message may indicate which of the actions is to be taken, e.g., the producer client 148A may be allowed to specify the types of operations. For example, the producer client 148A may wish to reuse or recycle IRs over time, in which case IRs may be retained instead of being deleted. After access has been terminated, the authentication coordinator 182 may send an "Access Terminated" message 823 back to the producer client 148A. In some embodiments service access termination or suspension may be requested by a consumer client 148B. As in the case of the setup operations illustrated in FIG. 3, some or all of the functionality of the authentication coordinator 182 shown in FIG. 8 may be performed by an authentication component 192 of the NIVM 180 in some embodiments.

Authentication Across Logical Network Partition Boundaries

Figure 9:
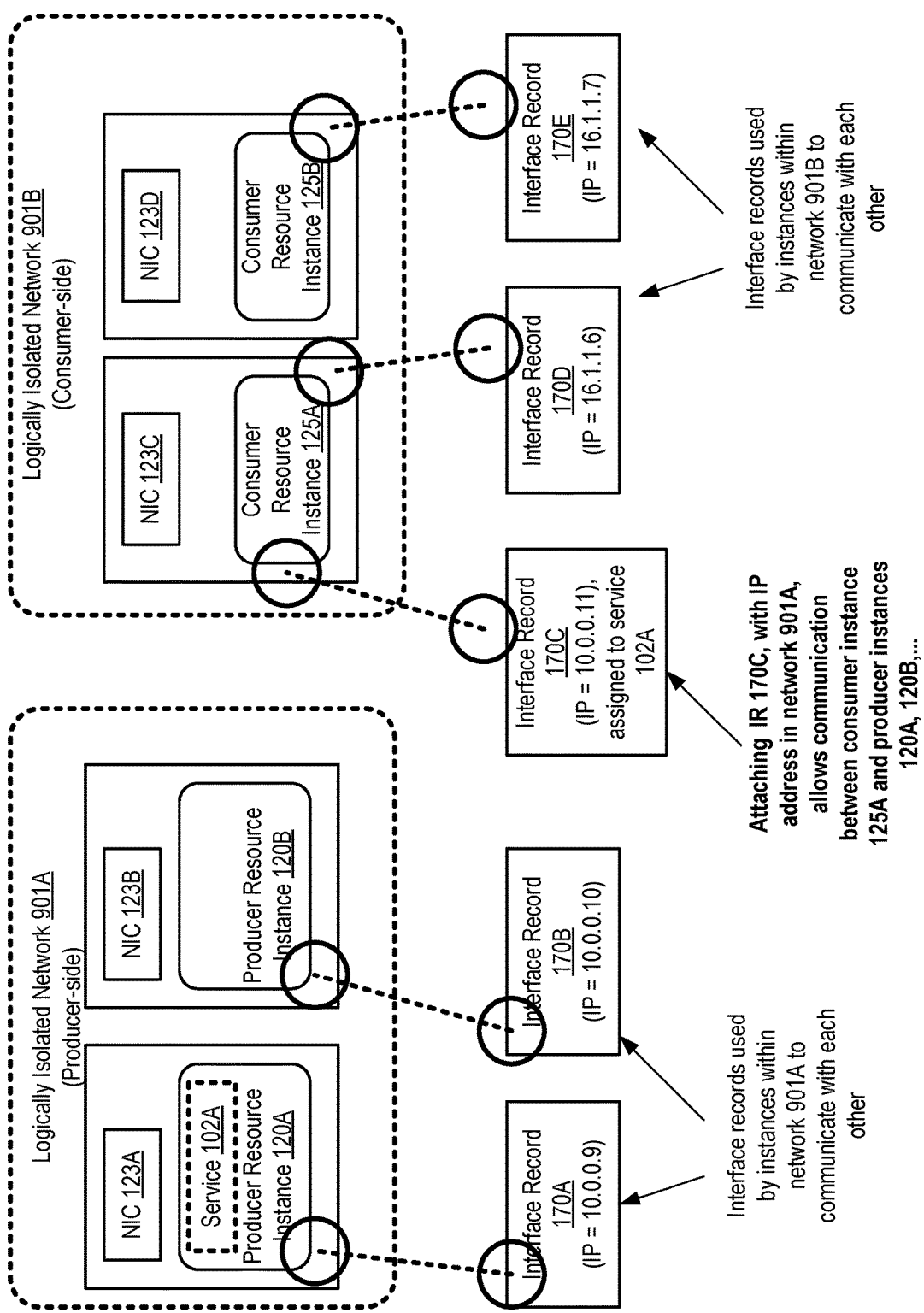
FIG. 9 illustrates an example configuration in which a service is implemented in one logically-isolated network, and accessed from a different logically-isolated network, according to one embodiment.

In provider networks that may be subdivided into logically-isolated partitions such as virtual private clouds on behalf of clients 148, producer resource instances for a particular service may reside within different partitions than at least some of the consumer resource instances that are permitted to access the service. The IRs 170 that are used to enable service authentication may serve as bridges or gateways that allow inter-partition communication in such environments. FIG. 9 illustrates an example configuration in which a service 102A is implemented in one logically-isolated network 901A, and accessed from a different logically-isolated network 901B, according to one embodiment.

In the illustrated example, a service 102A is implemented at a producer resource instance 120A of a producer-side logically-isolated network 901A. The resource instances of the producer-side network 901A use interface records with IP addresses beginning with "10.0.0." (e.g., the IP addresses usable for internal communications within network 901A may be specified in CIDR notation as "10.0.0.0/24"). Resource instances in a different, consumer-side logically isolated network 901B may use interface records with IP addresses beginning with 16.1.1.0 (e.g., the IP address range denoted by CIDR notation "16.1.1.0/24" may be in use in network 901B). A producer client 148 responsible for implementing service 102A may wish to implement the "Check Requests" authentication mode for the service. The producer client may allow a consumer resource instance 125A, which is already attached to IR 170D with an IP address 16.1.1.6 for intra-network communications within network 901B, to also attach to IR 170C, with IP address 10.0.0.11. If IR 170C is assigned to service 102A as shown, this would allow requests service requests originating at consumer resource instance 125A to flow to producer instance 120A where the service is implemented, and to pass service authentication checks at producer resource instance 120A. Prior to the attachment of IR 170C to consumer resource instance 125A, the service-providing instance 120A may not even have been reachable from logically-isolated network 901B in some implementations. Thus, IR 170C may serve two purposes in the illustrated environment: it enables connectivity between two logically-isolated networks, and it enables authentication of service requests that cross the boundaries of logically-isolated networks.

In some embodiments, where for example authentication may be needed only for requests made from instances belonging to other logically-isolated networks than the one where the service is implemented, the very fact that access across logically-isolated network boundaries is controlled using IRs 170 may be used to authenticate the service requests from other networks, without additional checks. For example, in one such embodiment, if a producer resource instance 120A within network 901A receives a service request, the request must have originated either from within network 901A, or from an external requester that has been allowed to attach to an IR within network 901A's IP address range. The fact that the external requester has been allowed to attach to such an IR may serve as sufficient authentication for certain kinds of services, and no IP address checks or license checks may be required.

Models for Controlling Concurrent Access Using Interface Records

Figure 10:
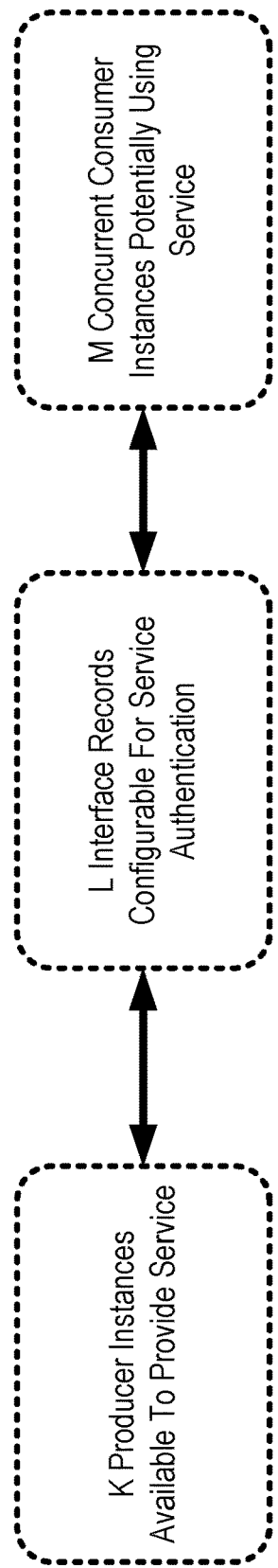
FIG. 10 illustrates a generic representation of a service usage environment comprising L producer resource instances, M interface records usable for authentication, and N consumer resource instances from which service requests may be issued, according to one embodiment.

The number of consumer resource instances 125 or users that can concurrently access a given service 102, or the maximum rate at which service requests are handled, may also be controllable using interface records 170 in various embodiments. FIG. 10 illustrates a generic representation of a service usage environment comprising K producer resource instances, L interface records usable for authentication, and M consumer resource instances from which service requests may be issued, according to one embodiment. A number of different concurrent usage models may be employed to determine the number of interface records that should be used in a given implementation, and the number of requests permitted for each interface record.

In one model, which may be termed a "proxy" model as shown in FIG. 10, one interface record may be assigned to the service 102, and may be used to funnel service requests to the provider resource instances 120 from any number of consumer resource instances 125. Any consumer resource instance that needs to access the service has to send its request through a "proxy" consumer resource instance to which the single interface record is attached. The proxy resource instance forwards the service request on to the producer resource instance, and if there is a response from the producer resource instance, may forward the response back to the original requester as well. In an extension of the basic proxy model, instead of using just one proxy, a few consumer resource instances may be configured as proxies, each attached to a respective IR 170 in embodiments where an IR may be attached to only one resource instance at a time.

In another model, which may be termed a "rate-limited" model, a maximum number of service requests per unit time may be permitted from each of the L interface records made available to the consumer client. Initially, for example, the consumer client may be allotted ten IRs, and 100 requests per hour may be permitted for each of the ten IRs. If the consumer wishes to make more than 1000 requests per hour in this example, the consumer would have to request additional IRs (or an increase in the request rate limit) from the producer client. In a third model, termed a "One IR per concurrent user" model, each consumer resource instance may be required to use a separate IR, i.e., M would have to be set equal to N. Various combinations of these and other concurrency models may be employed in some implementations, as desired; for example, a proxy model may also limit the number of requests per unit time.

Methods for Authentication Using Interface Records

Figure 11:
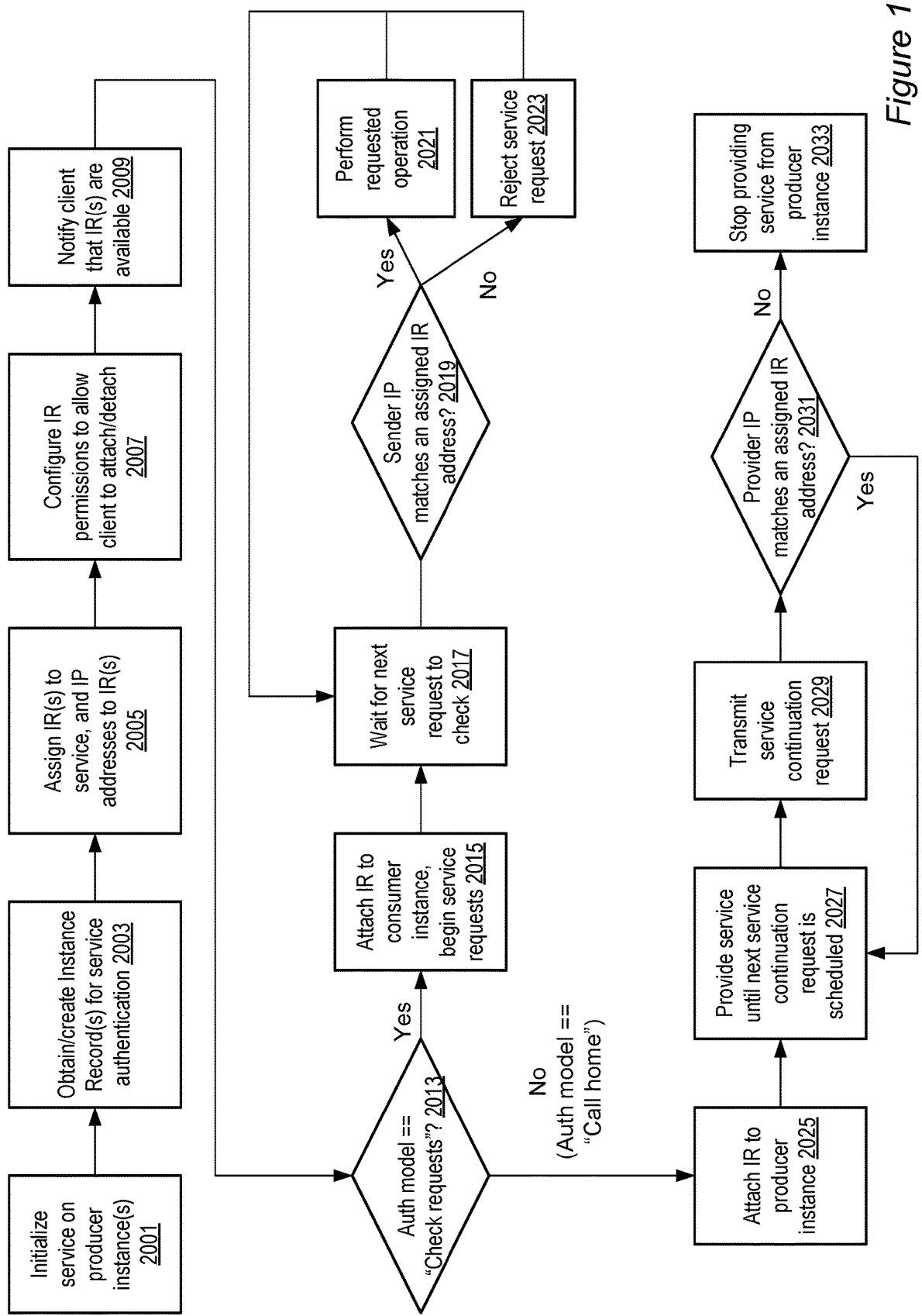
FIG. 11 is a flowchart of a method for providing service authentication using interface records, according to at least some embodiments.

FIG. 11 is a flowchart of a method for providing service authentication using interface records, according to at least some embodiments. A producer client may set up or initialize a service 102 on one or more producer resource instances 120, as shown in element 2001 of FIG. 11. One or more interface records 170 may be created (or obtained, in implementations where IRs are re-used) for service authentication, as shown in element 2003. The IRs 170 may then be assigned to the service (element 2005), e.g., by making the required modifications to the "assigned services information" field 229 shown in FIG. 2. One or more IP addresses may be assigned to the IRs as well in some embodiments. Permission to attach the IRs to desired (consumer or producer) resource instances may then be granted (element 2007), and the client that requested the authentication setup may be notified that the requested IRs 170 are available for attachment (element 2009). The operations shown in elements 2005 and 2007 of FIG. 11 may be performed in any order in various embodiments; for example, IP addresses may be assigned after attachment/detachment permissions are granted, or services may be assigned after attachment/detachment permissions are granted.

If the "Check Requests" authentication model is to be used, as determined in element 2013, the IR or IRs may be attached to consumer resource instance(s) as shown in element 2015, and the consumer resource instance(s) may begin sending service requests to the producer resource instance(s) providing the service. A producer resource instance may wait for the next service request to authenticate (element 2017). As described earlier, which specific service requests are authenticated may differ depending on the parameters selected for the "Check Requests" mode: for example, in one environment each service request may be checked, while in other environments service requests may be checked periodically or at random. For each service request that is selected for authentication, the source IP address may be checked to ensure that it matches an IP address of an IR 170 assigned to the service. If the sender IP address matches (element 2019), the requested service operation may be performed (element 2021). In some embodiments additional checks may also be performed before providing the service, such as ensuring that a license for the service remains valid. If the sender IP address does not match, the service request may be rejected (element 2023). The producer resource instance may then resume waiting for the next service request to check.

If the "Call Home" authentication model is being used, the IR or IRs may be attached to producer resource instances providing the service (element 2025) instead of being attached to consumer resource instances. The producer resource instance may then provide the service until the next service continuation request is scheduled (element 2027). In some implementations the first request may be scheduled as part of service startup—i.e., the service may not be provided at all until at least one service continuation request has been issued and an affirmative response for it has been received. The interval between service continuation requests may be determined by a parameter associated with the service—e.g., such request may be sent once every hour in one environment, and once every five minutes in another. The service continuation request may then be transmitted to a designated destination—e.g., to an authentication coordinator 182, or to some other target selected by the producer client that established the service. In some embodiments the designated destination may be a device (such as a license server) that resides outside the provider network, e.g., within a client network of the producer client, or some other device located in premises owned or managed by the producer client. The IP address of the sender of the service continuation request may then be checked to see of it matches an IP address of an IR assigned to the service (element 2031). If the address matches, a response to the service continuation request may be sent back to the producer client, and the provision of the service from that instance may continue. In some cases, additional checks, such as a verification of a license validity, may also be performed before an affirmative response is sent to the producer instance. If the address does not match, further provision of the service from the producer instance that sent the request may be terminated (element 2033).

In some embodiments, an authentication coordinator 182 may be operable to perform some of the operations illustrated in FIG. 11, such as obtaining an interface record in response to a client request, assigning the interface record to a service, or changing permissions of the interface record. In other embodiments, such operations may be implemented at an authentication component of an NIVM 180 that is also configured to support basic connectivity operations using interface records (such as attach and detach operations). In one embodiment, a combination of components spread across several entities, including for example an NIVM, instance authentication components 192 at producer resource instances, and/or a standalone authentication coordinator 182, may cooperate to provide the functionality.

While operations for both the "Check Requests" and the "Call Home" authentication modes are illustrated in FIG. 11, in some embodiments only one of the authentication modes may be supported. In addition to the core authentication operations illustrated in FIG. 11, interface records may also be used for billing-related operations in some embodiments. For example, a billing coordinator may use interface records to determine when, or for how long, an IR assigned to a service was attached to a resource instance, and may determine billing amounts to be charged to a client based on this data.

Example Use Cases

The service authentication functionality of interface records described above may be employed in a wide variety of application environments. For example, in one provider network in which separate logically-isolated networks or partitions are set up for clients, the authentication functionality may be used for services made available across partition boundaries, as illustrated in FIG. 9. Interface records may also be used in cases where both producer and consumer resource instances lie within the same logically-isolated network, or where the instances do not belong to any logically-isolated network at all, but are merely configured to use IRs for connectivity.

IRs may be deployed for authentication for applications or services of varying complexity and sophistication, and with wide differences in the number of supported clients or users. In one environment, for example, an operating system provider may instantiate its operating system on hundreds or thousands of virtual compute producer instances, assign IRs to the operating system "service", make the instances accessible to hundreds or thousands of consumer instances for general use, and employ the "Call-Home" authentication mode to ensure that the OS is installed only on an approved virtual compute instances. In another environment, a content management service that allows consumers to create, modify, and publish content such as news articles, videos and the like may be deployed on several application servers serving as producer instances, and a limited number of IRs may be set up for attachment by consumers of the content management system, with service requests being checked once every user session, or once every hour.

Illustrative Computer System

Figure 12:
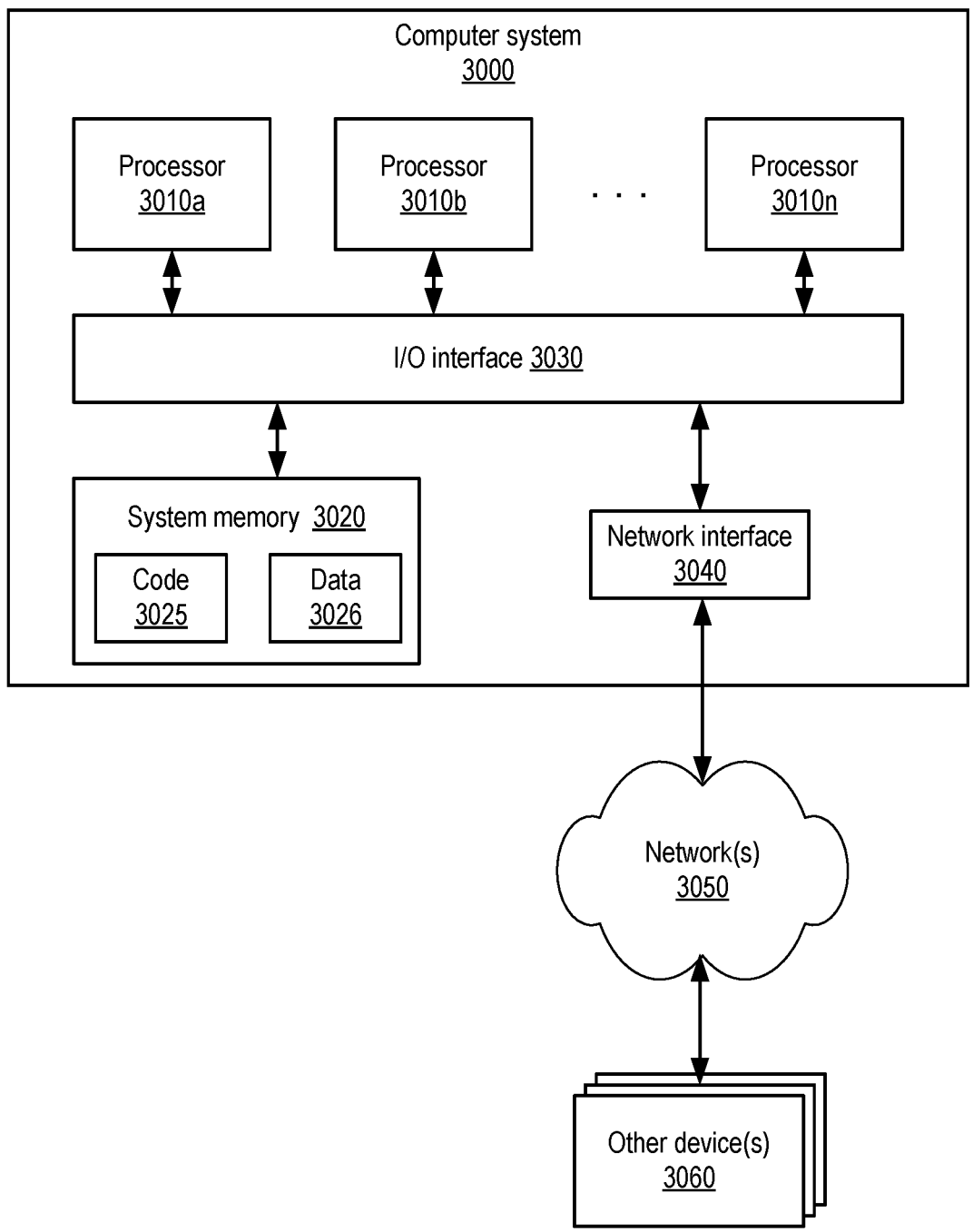
FIG. 12 is a block diagram illustrating an example computer system that may be used in some embodiments.

In at least some embodiments, a server that implements a portion or all of one or more of the technologies described herein, including the techniques to provide various services and operations related to authentication using interface records 170, may include a general-purpose computer system that includes or is configured to access one or more computer-accessible media, such as computer system 3000 illustrated in FIG. 12. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in FIGS. 1 through 11, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 11 for implementing embodiments of methods and apparatus for authentication using interface records. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computer systems such as that illustrated in FIG. 12 may be used to implement the described functionality in various embodiments; for example, software components running on a variety of different devices and servers may collaborate to provide the functionality.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers of a provider network configured to:
allocate, to a client of the provider network, a resource instance of the provider network and another resource instance of the provider network;
attach, by a network interface manager of the provider network, an interface record to the resource instance, wherein the interface record is assigned to a network-accessible service of the provider network, and wherein the interface record comprises information to be included in network transmissions for authentication, and wherein the attachment enables access to the network-accessible service from the resource instance based at least on the information of the interface record being included in the network transmissions from the resource instance to the network-accessible service;
detach, by the network interface manager, the interface record from the resource instance, wherein the detachment disables access to the network-accessible service of the provider network from the resource instance of the provider network; and
attach, by the network interface manager, the interface record to the other resource instance, wherein the attachment enables access to the network-accessible service from the other resource instance based at least on the information of the interface record being included in the network transmissions from the other resource instance to the network-accessible service, and
wherein the detachment of the interface record from the resource instance of the provider network and the attachment of the interface record to the other resource instance of the provider network subsequent to the detachment of the interface record from the resource instance of the provider network causes the access to the network-accessible service of the same provider network to which the interface record is assigned to be transferred from the resource instance of the provider network to the other resource instance of the provider network.

2. The system as recited in claim 1, wherein the information to be included in network transmissions for authentication comprises an indication of a license for the network-accessible service, and wherein the one or more computers are configured to:
   verify validity of the license indicated in a request from the other resource instance in order to enable the access to the network-accessible service.

3. The system as recited in claim 1, wherein to detach the interface record from the resource instance, the one or more computers are configured to:
   receive, from a client, a request to detach the interface record from the resource instance; and
   in response to reception of the request to detach the interface record from the resource instance, detach the interface record from the resource instance.

4. The system as recited in claim 1, wherein to attach the interface record to the other resource instance, the one or more computers are configured to:
   receive, from a client, a request to attach the interface record to the other resource instance; and
   in response to reception of the request to attach the interface record to the other resource instance, attach the interface record to the other resource instance.

5. The system as recited in claim 1, wherein to attach the interface record to the other resource instance, the one or more computers are configured to:
   receive, from a client, a selection of the other resource instance from among a plurality of available resource instances allocated to the client.

6. The system as recited in claim 1, wherein the interface record comprises one or more security properties, and wherein the one or more computers are configured to:
   configure the one or more security properties to allow detachment of the interface record from a resource instance or to allow attachment of the interface record to a resource instance.

7. The system as recited in claim 1, wherein the information to be included in network transmissions for authentication comprises a source Internet Protocol (IP) address, and wherein the one or more computers are configured to:
   verify that the source IP address of a request from the other resource instance has been assigned to the network-accessible service in order to enable the access to the network-accessible service.

8. A method, comprising:
   performing, by one or more computers of a provider network:
      allocating, to a client of the provider network, a resource instance and another resource instance;
      attaching, by a network interface manager, an interface record to the resource instance, wherein the interface record is assigned to a network-accessible service of the provider network, and wherein the interface record comprises information to be included in network transmissions for authentication, and wherein the attachment enables access to the network-accessible service from the resource instance based at least on the information of the interface record being included in the network transmissions from the resource instance to the network-accessible service;
      detaching, by the network interface manager, the interface record from the resource instance, wherein the detachment disables access to the network-accessible service of the provider network from the resource instance of the provider network; and
      attaching, by the network interface manager, the interface record to the other resource instance, wherein the attachment enables access to the network-accessible service from the other resource instance based at least on the information of the interface record being included in the network transmissions from the other resource instance to the network-accessible service, and
   wherein the detachment of the interface record from the resource instance of the provider network and the attachment of the interface record to the other resource instance of the provider network subsequent to the detachment of the interface record from the resource instance of the provider network causes the access to the network-accessible service of the same provider network to which the interface record is assigned to be transferred from the resource instance of the provider network to the other resource instance of the provider network.

9. The method as recited in claim 8, wherein the information to be included in network transmissions for authentication comprises an indication of a license for the network-accessible service, and further comprising:
   verifying validity of the license indicated in a request from the other resource instance in order to enable the access to the network-accessible service.

10. The method as recited in claim 8, wherein attaching the interface record to the other resource instance comprises:
   receiving, from a client, a selection of the other resource instance from among a plurality of available resource instances allocated to the client.

11. The method as recited in claim 8, wherein detaching the interface record from the resource instance comprises:
   receiving, from a client, a request to detach the interface record from the resource instance; and
   in response to receiving the request to detach the interface record from the resource instance, detaching the interface record from the resource instance.

12. The method as recited in claim 8, wherein attaching the other interface record to the other resource instance comprises:
   receiving, from a client, a request to attach the interface record to the other resource instance; and
   in response to receiving the request to attach the interface record to the other resource instance, attaching the interface record to the other resource instance.

13. The method as recited in claim 8, wherein the interface record comprises one or more security properties, and further comprising:
   configuring the one or more security properties to allow detachment of the interface record from a resource instance or to allow attachment of the interface record to a resource instance.

14. The method as recited in claim 8, wherein the information to be included in network transmissions for authentication comprises a source Internet Protocol (IP) address, and further comprising:
   verifying that the source IP address of a request from the other resource instance has been assigned to the network-accessible service in order to enable the access to the network-accessible service.

15. One or more non-transitory computer-accessible storage media storing program instructions that when executed on or across one or more processors of a provider network cause the one or more processors to:
allocate, to a client of the provider network, a resource instance of the provider network and another resource instance of the provider network;
attach, by a network interface manager, an interface record to the resource instance, wherein the interface record is assigned to a network-accessible service of the provider network, and wherein the interface record comprises information to be included in network transmissions for authentication, and wherein the attachment enables access to the network-accessible service from the resource instance based at least on the information of the interface record being included in the network transmissions from the resource instance to the network-accessible service;
detach, by the network interface manager, the interface record from the resource instance, wherein the detachment disables access to the network-accessible service of the provider network from the resource instance of the provider network; and
attach, by the network interface manager, the interface record to the other resource instance, wherein the attachment enables access to the network-accessible service from the other resource instance based at least on the information of the interface record being included in the network transmissions from the other resource instance to the network-accessible service, and
wherein the detachment of the interface record from the resource instance of the provider network and the attachment of the same interface record to the other resource instance of the provider network subsequent to the detachment of the interface record from the resource instance of the provider network causes the access to the network-accessible service of the same provider network to which the interface record is assigned to be transferred from the resource instance of the provider network to the other resource instance of the provider network.

16. The one or more storage media as recited in claim 15, wherein the information to be included in network transmissions for authentication comprises an indication of a license for the network-accessible service, and wherein the program instructions when executed on or across the one or more processors further cause the one or more processors to:
verify validity of the license indicated in a request from the other resource instance in order to enable the access to the network-accessible service.

17. The one or more storage media as recited in claim 15, wherein to detach the interface record from the resource instance, the program instructions when executed on or across the one or more processors further cause the one or more processors to:
receive, from a client, a request to detach the interface record from the resource instance; and
in response to reception of the request to detach the interface record from the resource instance, detach the interface record from the resource instance.

18. The one or more storage media as recited in claim 15, wherein to attach the interface record to the other resource instance, the program instructions when executed on or across the one or more processors further cause the one or more processors to:
receive, from a client, a request to attach the interface record to the other resource instance; and
in response to reception of the request to attach the interface record to the other resource instance, attach the interface record to the other resource instance.

19. The one or more storage media as recited in claim 15, wherein to attach the interface record to the other resource instance, the program instructions when executed on or across the one or more processors further cause the one or more processors to:
receive, from a client, a selection of the other resource instance from among a plurality of available resource instances allocated to the client.

20. The one or more storage media as recited in claim 15, wherein the information to be included in network transmissions for authentication comprises a source Internet Protocol (IP) address, and wherein the program instructions when executed on or across the one or more processors further cause the one or more processors to:
verify that the source IP address of a request from the other resource instance has been assigned to the network-accessible service in order to enable the access to the network-accessible service.

* * * * *